(12) United States Patent
Kamei et al.

(10) Patent No.: US 8,645,645 B2
(45) Date of Patent: Feb. 4, 2014

(54) FILE MANAGEMENT METHOD AND HIERARCHY MANAGEMENT FILE SYSTEM

(75) Inventors: Hitoshi Kamei, Sagamihara (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 617 days.

(21) Appl. No.: 12/348,339

(22) Filed: Jan. 5, 2009

(65) Prior Publication Data

US 2010/0095164 A1 Apr. 15, 2010

(30) Foreign Application Priority Data

Oct. 15, 2008 (JP) ................................. 2008-266803

(51) Int. Cl.
*G06F 12/16* (2006.01)

(52) U.S. Cl.
USPC ......................................... 711/161; 711/162

(58) Field of Classification Search
None
See application file for complete search history.

(56) References Cited

U.S. PATENT DOCUMENTS

| | | | |
|---|---|---|---|
| 6,269,382 B1 * | 7/2001 | Cabrera et al. ................ | 711/113 |
| 2004/0193760 A1 | 9/2004 | Matsunami et al. | |
| 2005/0108186 A1 * | 5/2005 | Anderson ......................... | 707/1 |
| 2006/0080370 A1 * | 4/2006 | Torii et al. ..................... | 707/204 |
| 2006/0129513 A1 * | 6/2006 | Nakatani et al. .................. | 707/1 |
| 2006/0242112 A1 | 10/2006 | Hikita | |
| 2007/0136391 A1 * | 6/2007 | Anzai et al. ................... | 707/201 |
| 2008/0155214 A1 | 6/2008 | Shitomi | |

FOREIGN PATENT DOCUMENTS

| | | |
|---|---|---|
| JP | 2006-301892 | 11/2006 |
| JP | 2008-159027 | 7/2008 |

OTHER PUBLICATIONS

Office Action issued in Japanese Patent Application No. 2008-266803 on Mar. 5, 2013.
"NFS Version 3 Protocol Specification", Sun Microsystems, Inc., Jun. 1995, 126 pages.
Office Action issued in Japanese Patent Application No. 2008-266803 on Sep. 4, 2012.

* cited by examiner

*Primary Examiner* — Than Nguyen
(74) *Attorney, Agent, or Firm* — Antonelli, Terry, Stout & Kraus, LLP.

(57) ABSTRACT

There is provided a file management method of a hierarchy management file system capable of preventing an access performance from dropping when a user accesses to a file. According to the method, a server creates file systems in high-speed and low-speed volumes and a file-sharing server virtually integrates those file systems into one system as a pseudo file system. Then, the server moves a file to be moved to the file system created in the low-speed volume in advance, not when an access is made to the file. When a user accesses to the file after that, the user directly accesses to destination without requiring to copy the file, so that the accessing performance may be prevented from dropping.

17 Claims, 16 Drawing Sheets

FIG.4

4000 HIERARCHY MANAGEMENT TABLE

| MOUNT PATH | FSID | TIER |
|---|---|---|
| /EXPORT | 0x01 | 0x00 |
| /Tier1 | 0x01 | 0x0F |
| /Tier2 | 0x02 | 0x11 |

- 4001: MOUNT PATH
- 4002: FSID
- 4003: TIER

FIG.5

5000 HIERARCHY DATA LIST

| MOUNT PATH | FSID | POINTER |
|---|---|---|

- 5001: MOUNT PATH
- 5002: FSID
- 5003: POINTER

FIG.6

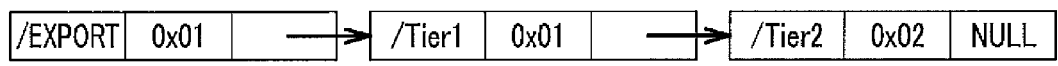

| /EXPORT | 0x01 | → | /Tier1 | 0x01 | → | /Tier2 | 0x02 | NULL |

FIG.7

7000 FILE MANAGEMENT TABLE

| FILE NAME | INODE NUMBER | POST-CONVERSION FSID | POST-CONVERSION INODE NO. |
|---|---|---|---|
| FILE1 | 0x0001 | 0x01 | 0x12345 |
| /DIR/FILE2 | 0x0002 | 0x02 | 0x12346 |

- 7001: FILE NAME
- 7002: INODE NUMBER
- 7003: POST-CONVERSION FSID
- 7004: POST-CONVERSION INODE NO.

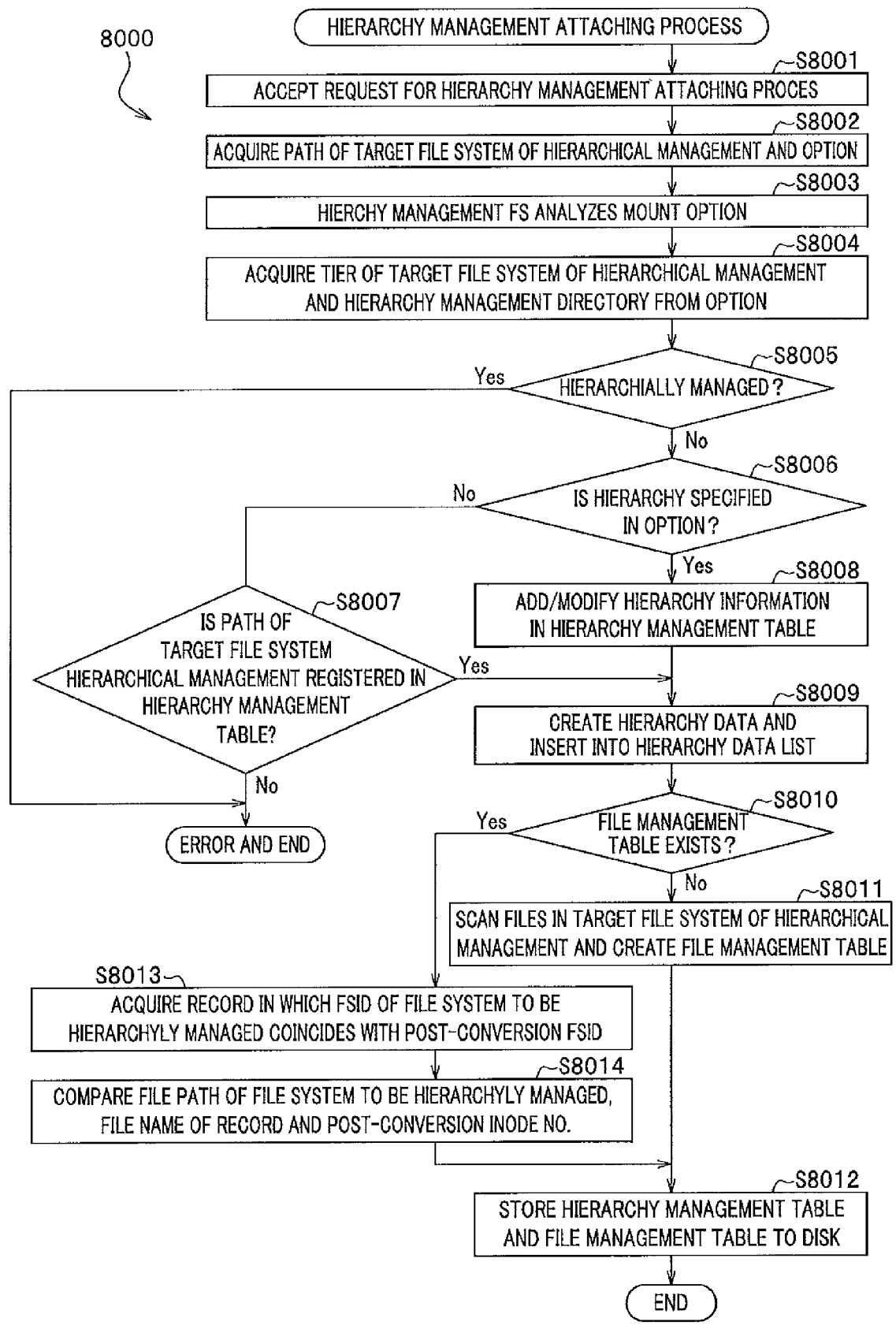

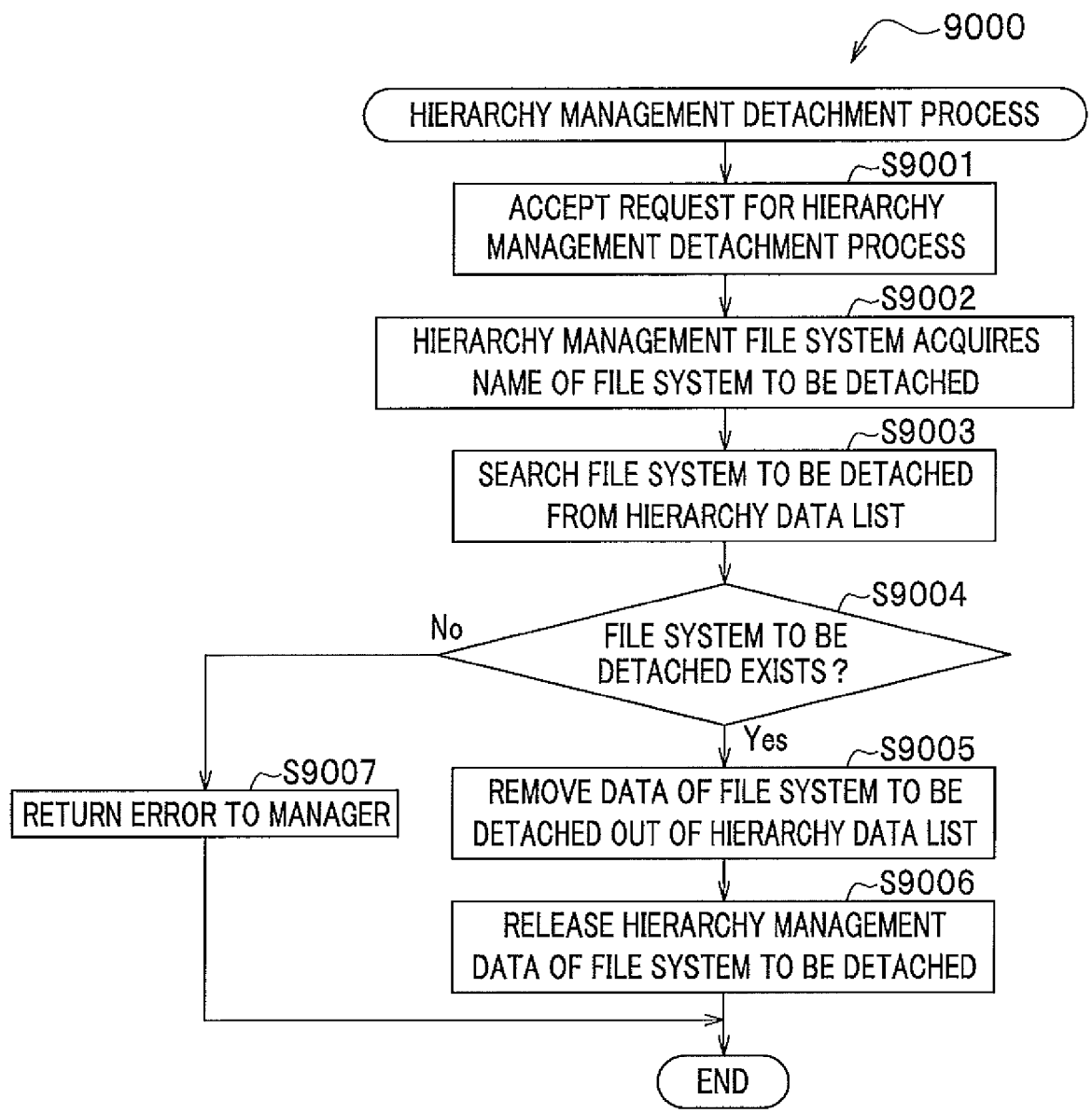

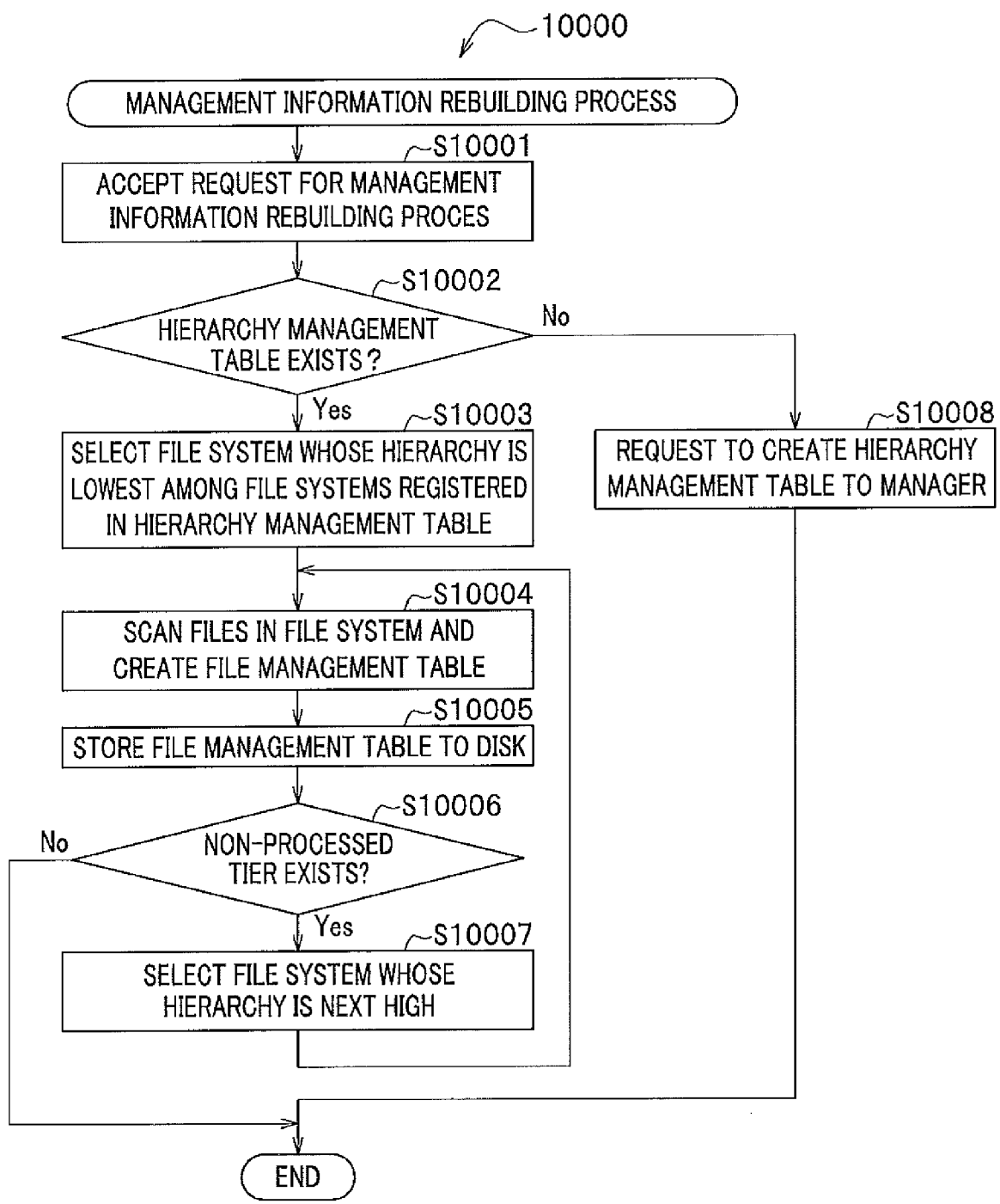

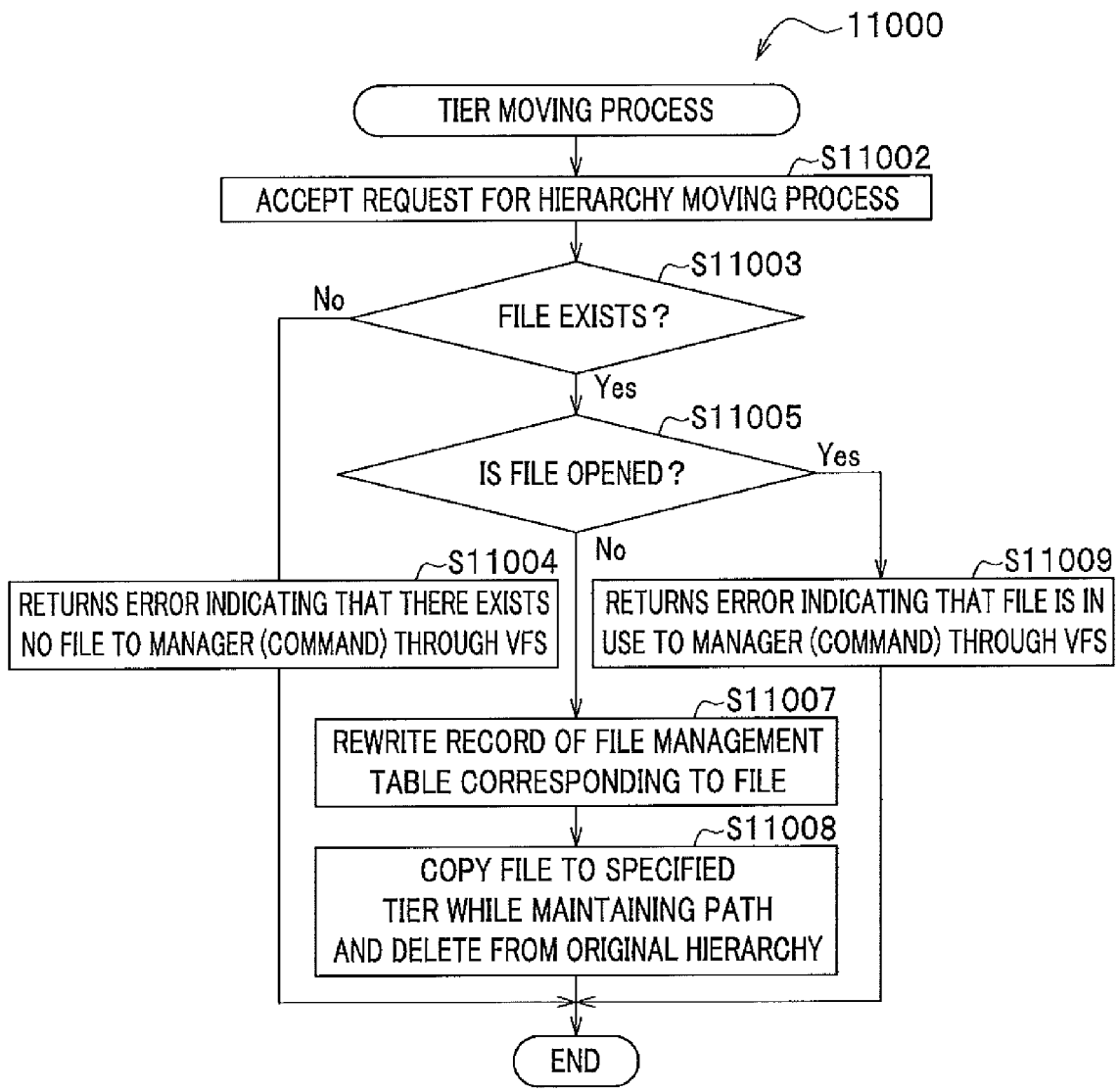

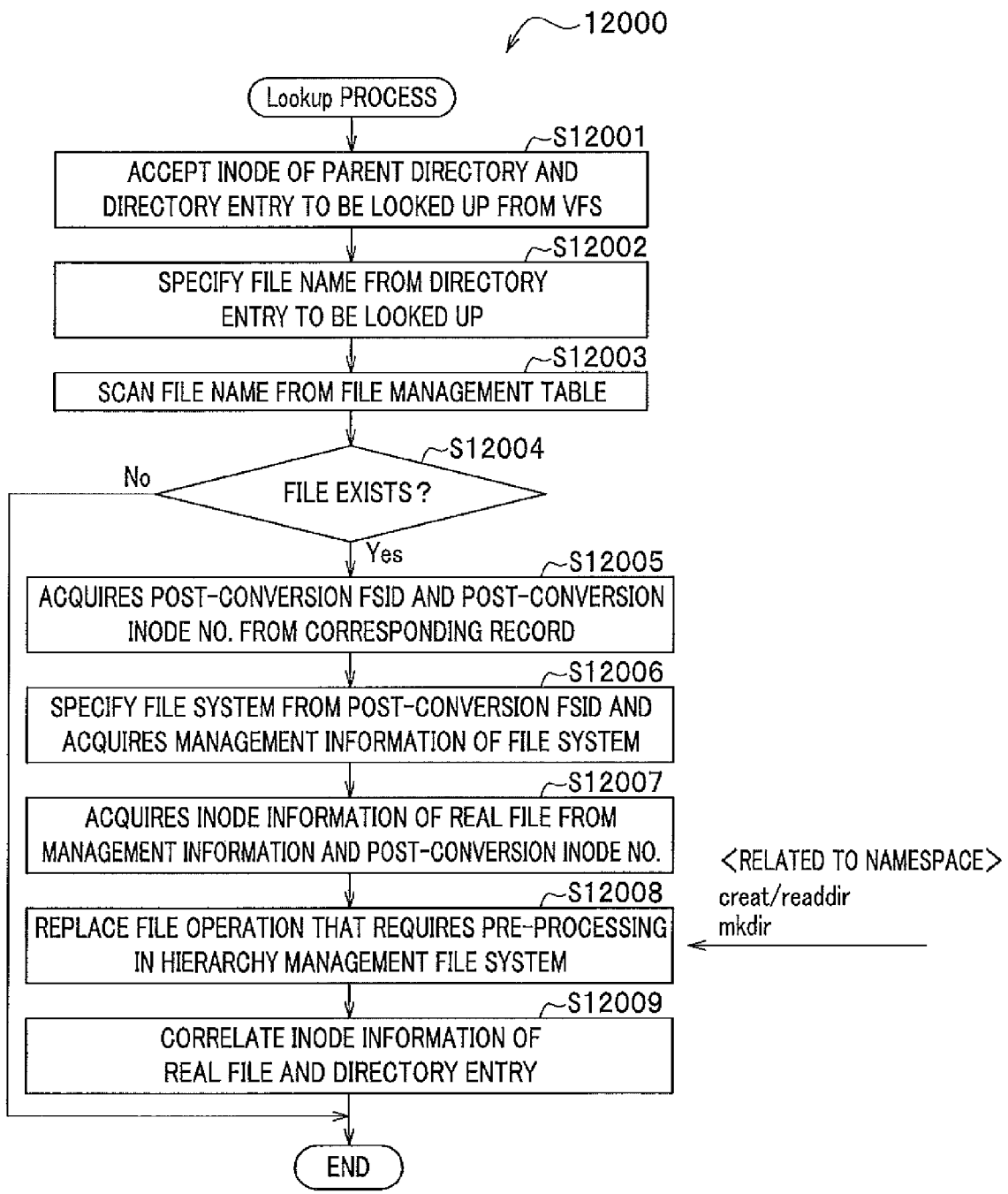

20000 FILE MANAGEMENT TABLE

| FILE NAME | INODE INFORMATION | POST-CONVERSION FSID | POST-CONVERSION INODE NO. |
|---|---|---|---|
| FILE1 | | 0x01 | 0x12345 |
| /DIR/FILE2 | | 0x02 | 0x12346 |

7001　20001　7003　7004

21000 FILE MANAGEMENT TABLE CACHE

| FILE NAME | INODE INFORMATION | POST-CONVERSION FSID | POST-CONVERSION INODE NO. | POINTER |
|---|---|---|---|---|
| | | | | |

21001　21002　21003　21004　21005

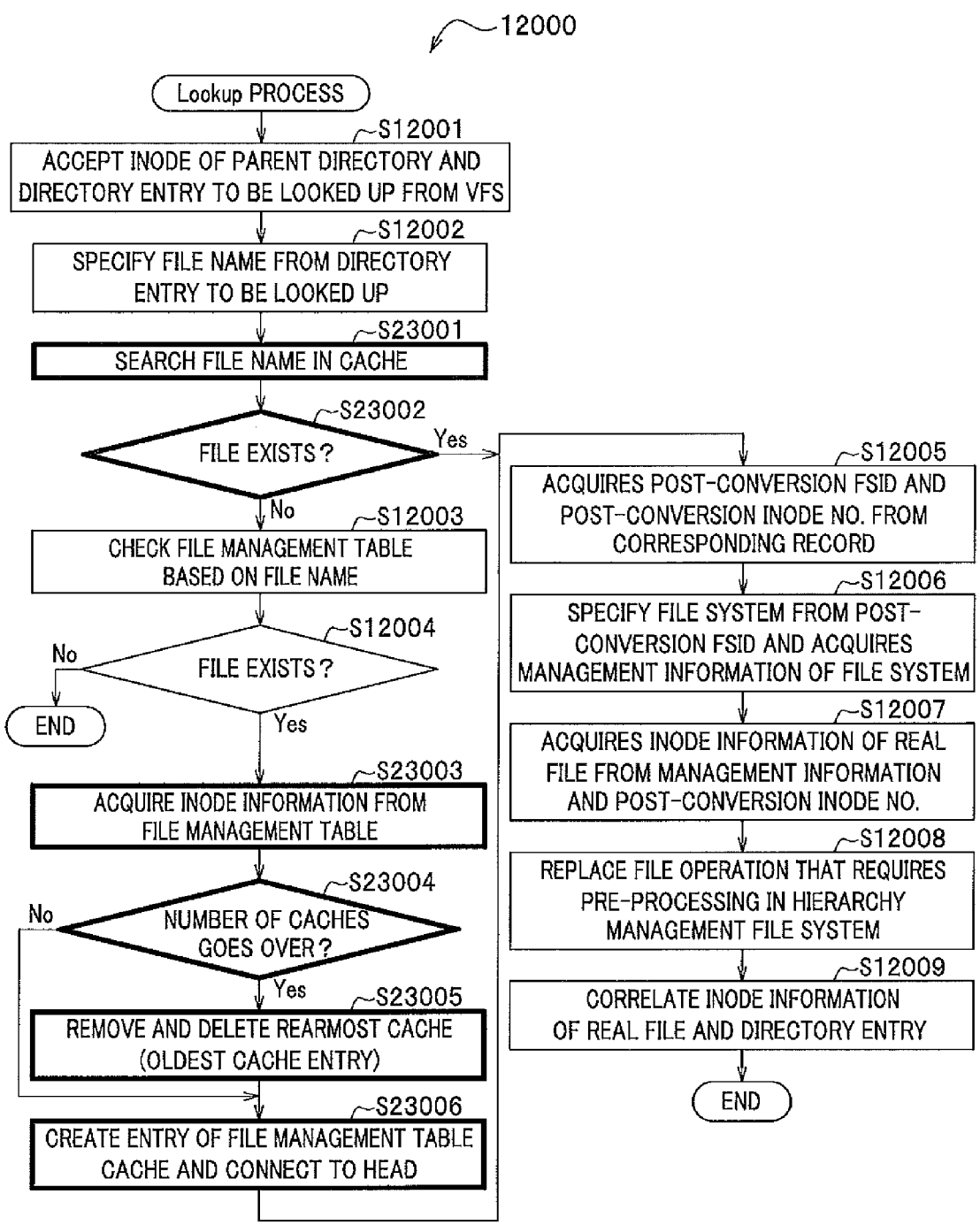

FILE MANAGEMENT METHOD AND HIERARCHY MANAGEMENT FILE SYSTEM

CROSS REFERENCE TO RELATED APPLICATIONS

This application claims the foreign priority benefit under Title 35, United States Code, §119 (a)-(d) of Japanese Patent Application No. 2008-266803, filed on Oct. 15, 2008 in the Japan Patent Office, the disclosure of which is herein incorporated by reference in its entirety.

BACKGROUND OF THE INVENTION

1. Field of the Invention

The invention relates to a file management method and a hierarchy management file system for optimally allocating files corresponding to characteristics of a file system.

2. Description of Related Art

Currently, storage devices having various performances are being developed and volumes composing the storage device have differences in their performances. In general, a high-performance volume is expensive and is unable to hold a large capacity. Meanwhile, a low-performance volume is inexpensive and can hold a large capacity.

Still more, there is a tendency that although data stored in the volume is frequently used by a user right after when the data is created, the data is not used after a period of time. Thus, there is a problem that the expensive volume is uneconomically consumed if the non-used data is continuously stored in the high-performance volume.

There has been known a data management method called a Hierarchical Storage Management (HSM) function as what solves these problems. According to the HSM function, a storage device has a plurality of volumes having different performances and a file-sharing server creates file systems in those volumes. Then, the file-sharing server moves data from the high-performance volume to the low-performance volume according to a frequency of use.

Thus, the HSM function holds a file frequently used in the "high-speed and expensive" volume and a file not used so often in the "low-speed and inexpensive" volume. Thus, the HSM function aims at cutting costs required for storage by controlling the files as described above.

According to the HSM function as disclosed in US2004/0193760A1, a file system instructs to move a file not used to the low-speed volume. Then, when an application accesses to the file after that, the file system moves the file to the low-speed volume. US2004/0193760A1 discloses that the file system rewrites file management information of the high-speed volume at this time.

According to the prior art HSM function, the file system of the high-speed volume recognizes information of destination of the file by making reference to a stub file (or management information) held in the high-speed volume. The move of the file between the high-speed volume and the low-speed volume using the HSM function is triggered when a user accesses to the file. That is, when the user accesses to the file, there arises a problem that access performance drops in moving the file because the file system copies the file to be moved from the low-speed volume to the high-speed volume. Still more, even when a super high-speed volume that is faster than the high-speed volume is used, there is a problem that performance of the super high-speed volume cannot be fully utilized because the stub file is stored in the high-speed volume.

Accordingly, the invention seeks to solve the aforementioned problems and to provide a file management method and a hierarchy management file system capable of preventing the access performance from dropping when the user accesses to a file.

SUMMARY OF THE INVENTION

In order to attain the aforementioned object, according to a hierarchy management file system of the invention, a file-sharing server creates file systems in high-speed and low-speed volumes, respectively. Then, the file-sharing server virtually integrates the file systems into one file system. The hierarchy management file system moves a file to be moved to the file system created in the low-speed volume in advance, not when the file is accessed. Then, when the user accesses to the file, the user accesses directly to the destination without requiring to copy the file, so that it becomes possible to prevent the performance from dropping.

Thus, according to the invention, it is possible to prevent the access performance from dropping when the user accesses to the file.

BRIEF DESCRIPTION OF THE DRAWINGS

FIG. 4 shows a hierarchy management table that is management information of hierarchy of file systems;

FIG. 5 shows a basic data structure of a hierarchy data list;

FIG. 6 shows a data structure of the hierarchy data list that manages a real file system composing a pseudo file system in use as a list based on the basic data structure;

FIG. 7 shows a data structure of a file management table showing information of the real file system in which files are stored;

FIG. 8 is a flowchart showing processes for attaching the real file system in the hierarchy management;

FIG. 9 is a flowchart showing processes for removing the real file system out of the hierarchy management;

FIG. 10 is a flowchart showing processes for rebuilding a file management table;

FIG. 11 is a flowchart showing processes for moving hierarchy of the file;

FIG. 12 is a flowchart showing a Lookup process of a hierarchy management file system program;

FIG. 24 is a flowchart showing a Lookup process of the second embodiment.

BEST MODE FOR CARRYING OUT THE INVENTION

While the best mode for carrying out the invention will be explained below with reference to the appended drawings, it is noted that the invention will not be limited to such mode.

First Embodiment

Figure 1:
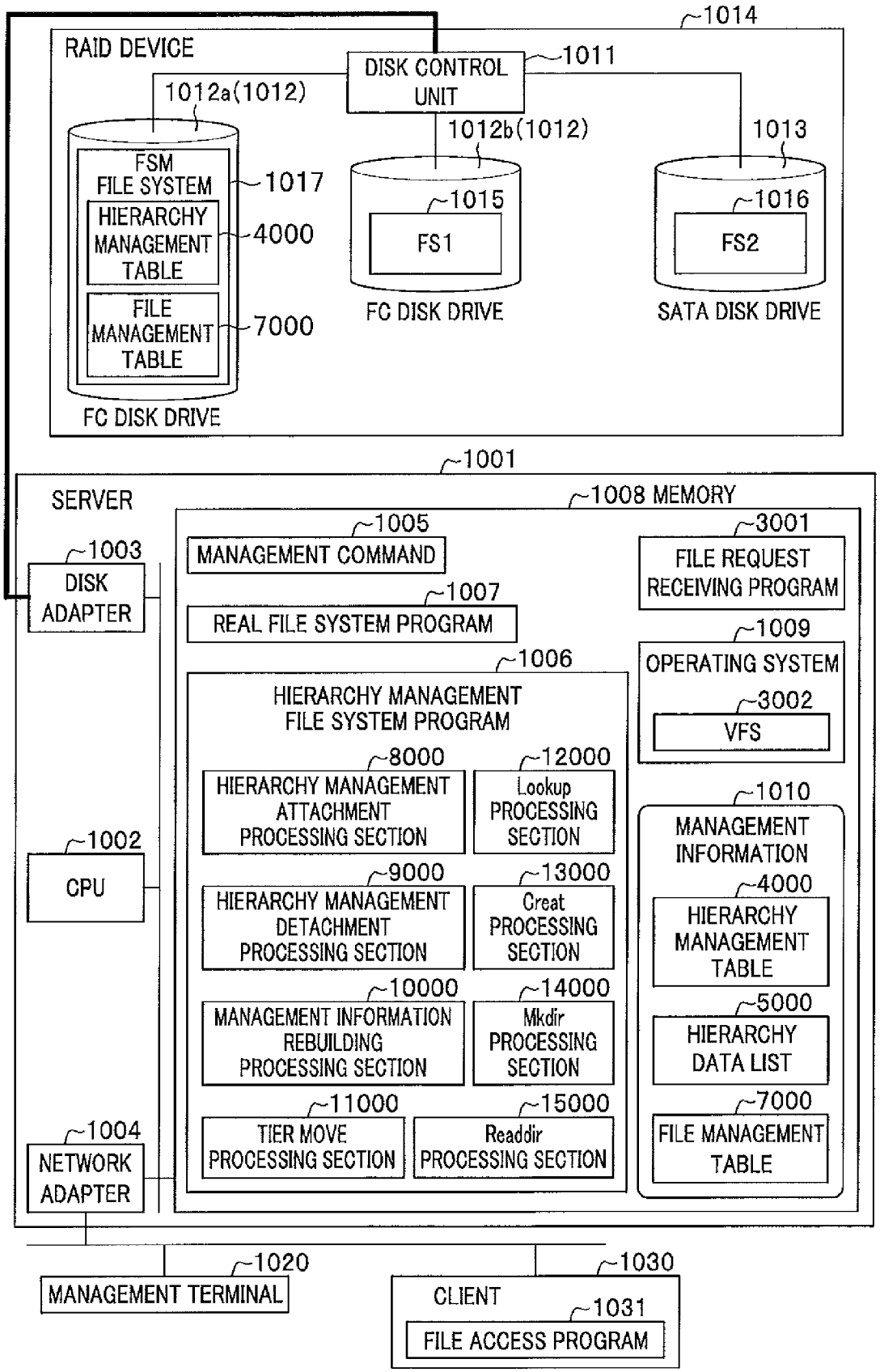
FIG. 1 is a block diagram showing an exemplary configuration of a hierarchy management file system to which the invention is applied.

FIG. 1 is a block diagram showing an exemplary configuration of a hierarchy management file system to which the invention is applied. The hierarchy management file system has a server 1001 (file server), a RAID (Redundant Arrays of Independent Disks) device 1014 (storage device) coupled with the server 1001, a management terminal 1020 and a client 1030 (client computer). The server 1001 is coupled with the RAID device 1014 through a SAN (Storage Area Network) not shown. The management terminal 1020, the client 1030 and the server 1001 are coupled through a LAN (Local Area Network) not shown.

The server 1001 is a computer having a CPU 1002 that executes programs stored in a memory 1008, a disk adapter 1003 used in communicating with the RAID device 1014, a network adapter 1004 utilized in communicating with the management terminal 1020 and the client 1030 and the memory 1008 that stores programs and data. Those parts are coupled through internal communication paths such as a bus.

The memory 1008 of the server 1001 stores the programs and data as described above. Specifically, the memory 1008 stores a management command 1005, a hierarchy management file system program 1006, a real file system program 1007, a file request receiving program 3001, an operating system 1009 and a management information 1010.

The management command 1005 manages a HSM function provided by the server 1001. The hierarchy management file system program 1006 is a center of the HSM function provided by the server 1001. The real file system program 1007 is a program that manages a FS1 (1015) and a FS2 (1016) that are file systems of a FC (Fibre Channel) disk drive 1012 and a SATA (Serial Advanced Technology Attachment) disk drive 1013 of the RAID device 1014. The operating system 1009 manages the whole server 1001. The operating system 1009 includes a VFS 3002 described later.

The file request receiving program 3001 is a server program that accepts a connection of a terminal emulator from the management terminal 1020 and a file access request from a file access program 1031 of the client 1030. The management information 1010 is management data for providing the HSM function. These programs and data will be detailed later.

Figure 14:
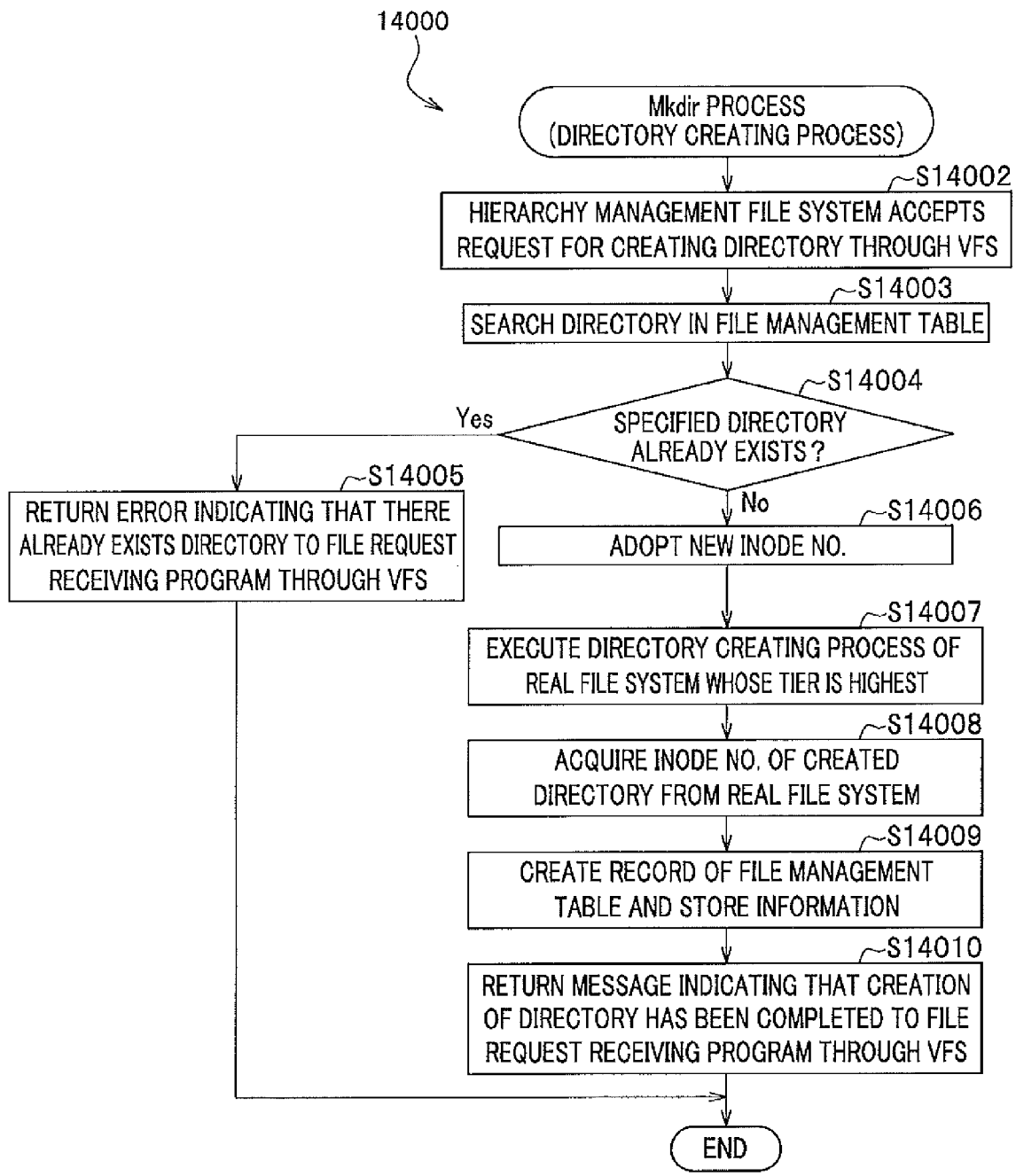
FIG. 14 is a flowchart showing a Mkdir process of the hierarchy management file system program.
Figure 15:
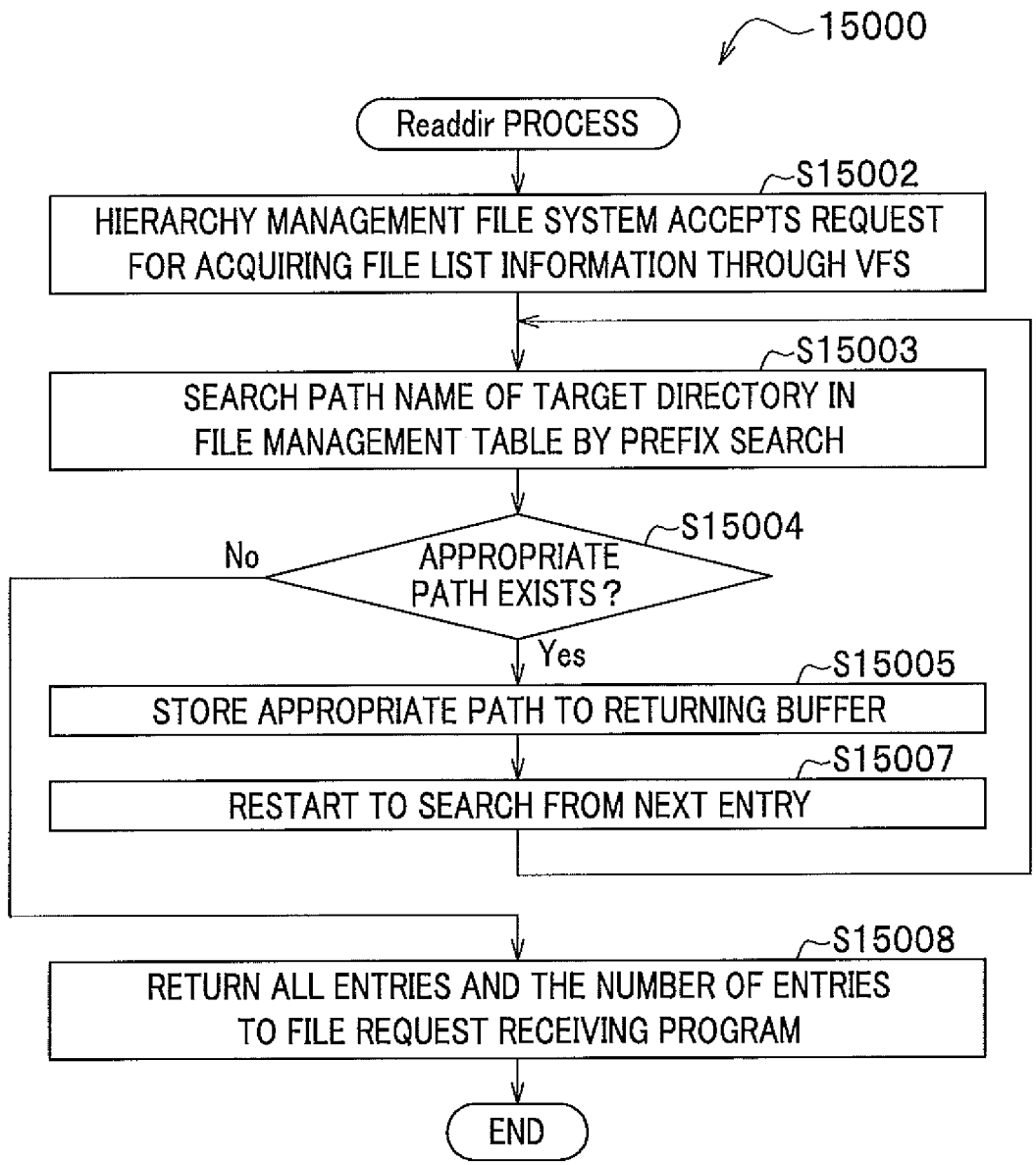
FIG. 15 is a flowchart showing a Readdir process of the hierarchy management file system program.

The hierarchy management file system program 1006 is composed of a hierarchy management attachment processing section 8000 (see FIG. 8), a hierarchy management detachment processing section 9000 (see FIG. 9), a management information rebuilding processing section 10000 (see FIG. 10), a tier move processing section 11000 (see FIG. 11), a Lookup processing section 12000 (see FIG. 12), a Creat processing section 13000 (see FIG. 13), a Mkdir processing section 14000 (see FIG. 14) and a Readdir processing section 15000 (see FIG. 15).

The RAID device 1014 has a disk control unit 1011 that controls volumes provided by the RAID device 1014 to the server 1001, FC disk drives 1012a (1012) and 1012b (1012) that are the volumes to be provided to the server 1001 and the SATA disk drive 1013. The FC disk drive 1012a stores a FSM file system 1017 that stores a hierarchy management table 4000 (file system hierarchy management information) and a file management table 7000 (file management information) described later. The disk control unit 1011, the FC disk drives 1012, the SATA disk drive 1013 and the FSM file system 1017 are coupled through internal communication paths. Note that FSM is an abbreviation of File System Management.

It is noted that the FC disk drive 1012 and the SATA disk drive 1013 have differences in their performances. For example, the FC disk drive 1012 performs well as compared to the SATA disk drive 1013. A SAS (Serial Attached SCSI) drive may be also used instead of the FC disk drive 1012.

A reason why these plurality of different types of disk drives are both used as described above is because it has become necessary to meet at least two or more conditions among items of cost, capacity, reliability, performance and others because inexpensive and large-capacity disk drives, e.g., the SATA disk drive, are in circulation together with expensive and high-performance disk drives e.g., the FC disk drive, the SAS disk drive and SSD (Solid State Disk) using a flash memory due to the day-to-day technological development.

It is noted that not only the FC disk drive 1012 and the SATA disk drive 1013, the disk drive may be one also for optical media such as a CD (Compact Disc) and a MO (Magneto-Optical) disk, a DVD (registered trade mark) and others and the invention is applicable as long as the storage device can create a file system. Still more, the invention is applicable not only to the disk drives but also to what can be recognized as a file system and is hence applicable to a file system of file-sharing protocol such as a NFS (Network File System) and a CIFS (Common Internet File System).

It is noted that while maximum transfer speed, maximum IOPS (Input/Output operations Per Second) and the like may be considered firstly as the difference of performance regarding the disk drives, values obtained by dividing those values by at least either one of price and power consumption may be also considered. The different types of disk drives may be properly used by considering differences about characteristic values, e.g., costs, capacity and reliability, other than the difference of performance. Although it is conceivable to determine the characteristic values based on values in a catalog provided by a vendor producing the disk drives, the characteristic values may be acquired by actually accessing to the individual disk drives. While the invention will be explained by exemplifying the performance hereinafter, the invention is also effective to disk drives used together based on the characteristic values other than the performance.

The FS1 (1015) is created in the FC disk drive 1012 and the FS2 (1016) is created in the SATA disk drive 1013. The file systems hold data created by a user of the client 1030 in a file format. These file systems will be called as real file systems in some cases hereinafter. It means that a "real" file system is created on the volume because the invention creates a "pseudo" file system as described later.

The management terminal 1020 is a computer used by a manager who manages the server 1001. The manager uses the management command 1005 of the server 1001 from the management terminal 1020 through the network. The client 1030 is a computer using a file-sharing service provided by the server 1001. The user who uses the client 1030 uses the file-sharing service of the server 1001 through the file access program 1031.

The followings are meaning of terms used in the explanation hereinafter:

(A) "File": a logical entity for storing data generated by the client 1030 or the server 1001;

(B) "Directory": a logical unit that manages files and directories in aggregation;

(C) "Directory Name": a name given to the directory;

(D) "Path" or "Path Name": identification information for identifying the files or directories; and (E) "File Name": a name given to the file. It is noted that there is a case when the file name includes the path name in the following explanation.

Figure 2:
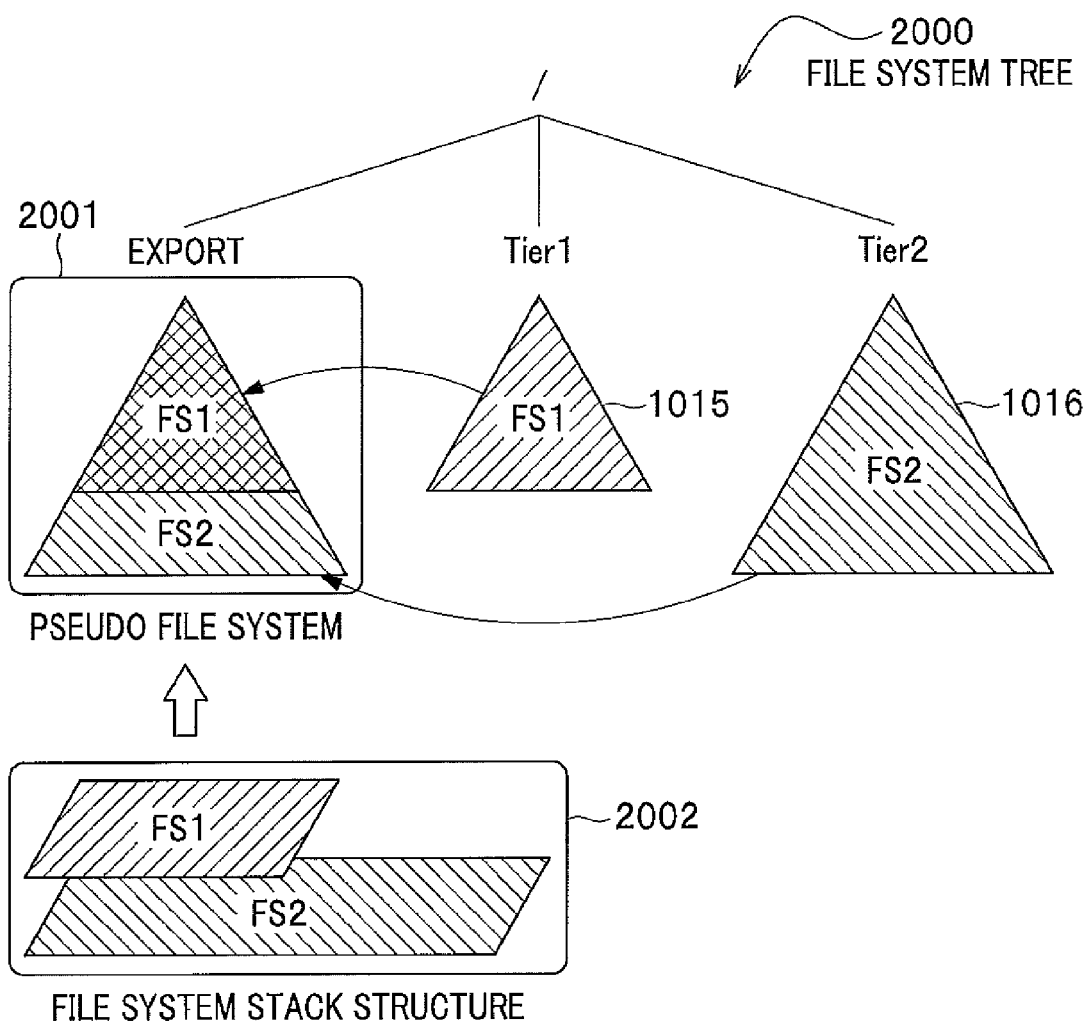
FIG. 2 shows a file system tree structure when a HSM function of an embodiment is used.

FIG. 2 shows a file system tree structure when the HSM function of the embodiment is used. The file system tree is a file system namespace built by the server 1001 and provided to the client 1030.

The file system tree 2000 is composed of "/(root)" and "EXPORT," "Tier 1" and "Tier 2" under the root. The FS1 (1015) is mounted in the Tier 1 and the FS2 (1016) is mounted in the Tier 2. According to the HSM function of the present embodiment, the Tier 1 and the Tier 2 are stacked in the EXPORT directory. At this time, a pseudo file system 2001 is created by allocating the FS1 (1015) above the FS2 (1016) as shown in a file system stacking structure 2002.

The client 1030 uses the file systems under the EXPORT in the present embodiment. When the user of the client 1030 creates a file, the file is created in the FS1 (1015). Then, when a frequency of use of the file drops, this file is moved to the FS2 (1016). Thereby, the file whose frequency of use is low is moved from the high-speed volume to the low-speed volume. It is noted that the file whose frequency of use has dropped may be specified by the user of the server 1001, may be specified based on a predetermined rule set in the server 1001 in advance or may be specified by other methods.

When the HSM function forms the pseudo file system 2001 and when there exist files having the same name in the FS1 (1015) and the FS2 (1016), the file in the FS1 (1015) is registered in the pseudo file system 2001. As a result, the file having the same name existing in the FS2 (1016) is not provided to the client 1030. It is because the FS1 (1015) is allocated such that it covers the FS2 (1016) as shown in the file system stacking structure 2002 in FIG. 2.

Note that it is possible to stop to provide the FS1 (1015) and the FS2 (1016) to the client 1030 when they are to be integrated. The manager can freely integrate the file systems in use by the method described above.

Figure 3:
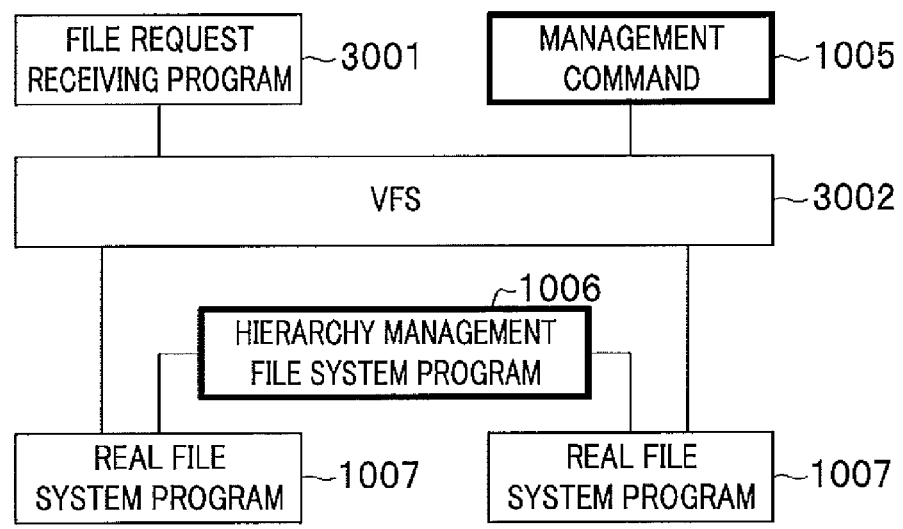
FIG. 3 is a block diagram showing a software configuration of a server.

FIG. 3 is a block diagram showing a software configuration of the server. The software configuration of the server 1001 is composed of the file request receiving program 3001, the management command 1005, the VFS (Virtual File System) 3002, the hierarchy management file system program 1006 and the real file system program 1007. The management command 1005 and the file request receiving program 3001, such as a file-sharing server program, receiving a file request from the client 1030 request an access to the VFS 3002 that is part of the operating system 1009. The VFS 3002 is a program having functions of virtualizing access interfaces of the real file system program 1007 and the hierarchy management file system program 1006 and of providing file systems to the management command 1005 and the file request receiving program 3001. It is noted that because the management command 1005 and the hierarchy management file system program 1006 are characteristic parts of the present embodiment, they are shown by thick lines in FIG. 3.

The hierarchy management file system program 1006 receives the access request from the file request receiving program 3001 and the management command 1005 through the VFS 3002. The hierarchy management file system program 1006 also requests an access to the real file system program 1007, e.g., the FS1 (1015) and the FS2 (1016). Meanwhile, there is also a case when the real file system program 1007 receives an access request directly from the VFS 3002. Thus, the VFS 3002 is software composing an operating system that intermediates the file request receiving program 3001 and the file system program (the hierarchy management file system program 1006 and the real file system program 1007).

It is noted that the file request receiving program 3001 and the management command 1005 that operate in the server 1001 may operate as part of a kernel or may operate as a general program that is a more protected execution environment different from the kernel.

Requests received by the file request receiving program 3001 from the client 1030 include the following types of requests for example. It is noted that although exemplary requests in the NFS (Network File System) and CIFS (Common Internet File System) are shown in the following explanation, the requests may contain commands other than those described below or may be replaced with other commands.

(A) A lookup request for acquiring an identifier (referred to as a file handling identifier hereinafter) necessary for making reference to and handling the following files or directories (B) through (H) from a path name of a file or a directory. In the case of the NFS protocol, there is a Lookup command specifying a path name for example.

(B) A creat request for generating a file in a specified directory with a specified file name. In the case of the NFS protocol, it includes a file handling identifier of the directory acquired by the lookup request and a Create command having an argument of the file name. In the case of the CIFS protocol, it is a SMB_COM_CREATE command having arguments of the directory name and the file name.

(C) A mkdir request for generating a new directory under a specified directory (a directory name of the new directory is also specified). In the case of the NFS protocol, it includes the file handling identifier of the directory acquired by the lookup request and an Mkdir command having an argument of the name of the new directory. In the case of the CIFS protocol, it is a SMB_COM_CREATE_DIRECTORY command having arguments of the directory name and the new directory name for example.

(D) A readdir request for transmitting file names or directory names of one or more files or directories existing under the specified directory to the client 1030. In the case of the NFS protocol, it is a Readdir command having an argument of the file handling identifier of the directory acquired by the lookup request for example. In the case of the CIFS protocol, it is, for example, a SMB_COM_TRANSACTION2: TRANS2_QUERY_PATH_INFORMATION command having an argument of the directory name.

(E) An open request for asking the server 1001 to prepare to read from/write into the specified file. In the case of the NFS protocol, it is an open command having an argument of the file handling identifier of the file acquired by the lookup request. In the case of the CIFS protocol, it is a SMB_COM_OPEN command having an argument of the file name (including the path name) for example. It is noted that in the case of the CIFS protocol, an identifier (referred to as an open identifier hereinafter) for conducting a file read or write process as response information of the SMB_COM_OPEN is transmitted to the client 1030.

(F) A read request for reading data of the file prepared by the open request. In the case of the NFS protocol, it is a read command having an argument of the file handling identifier of the file acquired by the lookup request. In the case of the CIFS protocol, it is a SMB_COM_READ command having an argument of the open identifier for example.

(G) A write request for writing the data of the file prepared by the open request. In the case of the NFS protocol, it is a write command having an argument of the file handling identifier of the file acquired by the lookup request for example. In the case of the CIFS protocol, it is a SMB_COM_WRITE command having an argument of the open identifier for example.

(H) A close request for ending the preparation carried out by the open request. In the case of the NFS protocol, it is a close command having an argument of the file handling identifier of the file acquired by the lookup request for example. In the case of the CIFS protocol, it is a SMB_COM_CLOSE command having an argument of the open identifier for example.

It is noted that when a directory or a file is to be specified in each request, each request may attach any mode of information as far as the server 1001 can receive information that enables the server 1001 to specify the directory or file, besides attaching the directory name or file name as its argument.

Still more, files stored by the server 1001 into the volume and managed may include ones that are used by the server 1001 itself or allowed to be read and/or written only by specific clients among a plurality of clients from security reasons. In order to deal with such requests, the file request receiving program 3001 of the server 1001 has a function called Export. The export function is a function for providing a directory and a file (in other words, a directory space) under a predetermined directory (referred to as an export directory hereinafter) of a file system defined by the server 1001 in a logical volume only to a predetermined client 1030 (export destination client). In this case, the directory space is converted so that the directory and the file under the predetermined directory described above exist in a top directory for the predetermined client 1030 described above.

When the server 1001 manages a "work" directory having a "homework.txt" file and a "/home/user1" directory having a "diary.txt" file under the server for example, the "/home/user1" directory is specified as the export directory. Then, when a client having a name 'foo' is specified out of a plurality of clients, it seems for the foo client that the "work" directory and "diary.txt" file exist right under the root directory of the directory space provided by the server.

FIG. 4 shows a hierarchy management table that is management information of hierarchy of file systems. The hierarchy management table 4000 is part of the management information 1010. When the manager creates a pseudo file system by using the management command 1005, the hierarchy management file system program 1006 creates the hierarchy management table 4000 that is information for managing correspondences between the "pseudo" file system and the "real" file system. The hierarchy management table 4000 is composed of, as one record, a mount path 4001 indicating mounting position of the file systems, e.g., FS1 (1015) and FS2 (1016), a FSID 4002 that is a management ID of the file system and a tier 4003 indicating hierarchy of the file system.

The hierarchy management file system program 1006 records path information where the file system is mounted to the mount path 4001 by a complete path name. The complete path name is a path beginning with /(root) and corresponds to "/EXPORT" and others as shown in FIG. 4 for example.

The FSID 4002 records a value set when the manager mounts the real file system. The value set by the manager is used as the FSID described hereinafter.

The hierarchy management file system program 1006 also uses a specific value of the tier 4003 for purposes other than the hierarchy. When 0x00 is set in the tier 4003 for example, the management command 1005 and the hierarchy management file system program 1006 recognize that the very tier is the pseudo file system 2001 (see FIG. 2).

Still more, the management command 1005 adopts the number of the tier 4003 not starting from 0x01 (1 in decimal number) but by two numbers each from 0x0F (16 in decimal number). Thereby, it becomes easy to add a tier on top of the highest tier. It becomes also easy to add a tier between tiers. However, this number adopting method is one example and the present embodiment does not specifically limit the number adopting method.

FIG. 5 shows a basic data structure of a hierarchy data list and FIG. 6 shows a data structure of the hierarchy data list that manages real file systems composing a pseudo file system in use as a list based on the basic data structure. The hierarchy data list 5000 is part of the management information 1010. As shown in FIG. 5, the basic data structure of the hierarchy data list 5000 is composed of a mount path 5001 indicating a path being mounted, a FSID 5002 indicating an ID of the file system and a pointer 5003. It is noted that the hierarchy data list 5000 shown in FIGS. 5 and 6 is different from the hierarchy management table 4000 shown in FIG. 4 in that while the hierarchy management table 4000 is a permanent table, the hierarchy data list 5000 is a temporary table during operation.

Specifically, the hierarchy data list 5000 shown in FIG. 6 shows a hierarchy structure headed with the pseudo file system 2001 (/EXPORT). For instance, when the "/Tier 1" is removed due to an instruction of the manager, even though the hierarchy management table 4000 is not changed, the hierarchy data list 5000 is changed. The hierarchy management file system program 1006 rewrites a pointer of the "/EXPORT" in the hierarchy data list 5000 and changes to specify the "/Tier 2." Then, the hierarchy management file system program 1006 abandons data of the "/Tier 1." Thereby, the hierarchy management file system program 1006 can manage the permanent hierarchy structural information and the temporary hierarchy structural information efficiently.

FIG. 7 shows a data structure of a file management table showing information of the real file system in which files are stored. The file management table 7000 is part of the management information 1010. The file management table 7000 is composed of a file name 7001 indicating a file name of the pseudo file system 2001, an inode No. 7002 of that file, a post-conversion FSID 7003 that is an ID of the file system in which that file is stored and a post-conversion inode No. 7004 uniquely specifying the file within the post-conversion file system.

The file management table 7000 correlates one file to one record. The hierarchy management file system program 1006 records the complete file path of the pseudo file system 2001 in the file name 7001. The file name recorded in the file name 7001 is the same with the path held by the hierarchically managing file system (real file system: the FS1 (1015) and the FS2 (1016) in the case of FIG. 2). When there is a file called "FILE 1" in the FS1 (1015) in FIG. 2 for example, the hierarchy management file system program 1006 records as "FILE 1" in the file name 7001. Meanwhile, when there is a file called "/DIR/FILE2" in the FS1 (1015), the hierarchy management file system program 1006 records as "/DIR/FILE2" in the file name 7001.

The user utilizing the client 1030 accesses to the file by specifying the file name 7001. At this time, the hierarchy management file system program 1006 specifies the record corresponding to the file name 7001 and switches the access to the real file system program 1007. This operation will be detailed later. It is noted that the file management table 7000 may be rebuilt by a management information rebuilding process shown in FIG. 10 even if it is lost, so that the present embodiment can realize high availability.

Next, management commands will be explained.
(Command for Attaching in Hierarchy Management)

Formulas A1 and B1 below show exemplary commands inputted when the manager integrates a real file system with the pseudo file system 2001 (to attach the real file system in the hierarchy management). Formula A1 is a format of a mount command and Formula B1 is a concrete example:

$$\text{mount-}t\ hmfs\text{-}o\ T\text{=}<\text{Tier}>, D\text{=}<\text{TARGET}><SRC><SRC> \quad (A1)$$

$$\text{mount-}t\ hmfs\text{-}o\ T\text{=}1, D\text{=}/\text{EXPORT/Tier1/Tier1} \quad (B1)$$

The manager logs in the server 1001 by coupling with the file request receiving program (terminal server program) 3001 by utilizing the terminal emulator of the management terminal 1020. Then, the manager executes the management command 1005 in order to attach the real file system in the hierarchy management.

In Formula A1, the manager specifies to use the hierarchy management file system by an option "-t" in the mount command. Then, the manager specifies an option of the hierarchy management file system program 1006 by an option "-o". Options used in the process for attaching in the hierarchy management are "T" and "D". The option T indicates the tier of the real file system and the option D indicates the path of the pseudo file system 2001. Then, the manager specifies the path of the file system in which the real file system is mounted in "SRC". Specifically, when the FS1 (1015) is attached in the hierarchy management (see FIG. 2), the manager specifies the "/Tier 1" as shown in Formula B1.

(Management Information Rebuilding Command)

Formulas A2 and B2 show exemplary commands for rebuilding the file management table 7000 when the table is destroyed. Formula A2 is a format of a mount command used in rebuilding the management information and Formula B2 is its concrete example:

$$\text{mount-}t\ hmfs\text{-}o\ I\text{=}<\text{Tier }DB>, D\text{=}<\text{TARGET}>hmfs\ hmfs \quad (A2)$$

$$\text{mount-}t\ hmfs\text{-}o\ I\text{=}/HMDB, D\text{=}/\text{EXPORT }hmfs\ hmfs \quad (B2)$$

The manager logs in the server 1001 by also coupling with the file request receiving program (terminal server program) 3001 by utilizing the terminal emulator of the management terminal 1020. Then, the manager executes the management command 1005 in order to attach the real file system in the hierarchy management.

In Formula A2, the option "-t" indicates that the hierarchy management file system program 1006 is used similarly to the attachment in the hierarchy management. The option of the hierarchy management file system program 1006 specified by the option "-o" is different in the rebuilding of the management information. The manager specifies a path of a file system in which the file management table 7000 is stored in an option I. The manager also specifies a path of the pseudo file system 2001 in an option D. In concrete, the manager instructs to rebuild a HMDB file stored in/as shown in Formula B2 in FIG. 2 for example.

(Command for Detaching out of Hierarchy Management)

Formulas A3 and B3 show exemplary commands inputted when the manager detaches a file system specified by the manager out of the hierarchy management. Formula A3 is a format of a process for detaching out of the hierarchy management and Formula B3 is its concrete example:

$$\text{umount}<SRC> \quad (A3)$$

$$\text{umount/Tier1} \quad (B3)$$

The manager logs in the server 1001 by also coupling with the file request receiving program (terminal server program) 3001 by utilizing the terminal emulator of the management terminal 1020. Then, the manager executes the management command 1005 in order to attach the real file system in the hierarchy management.

The manager can detach the file system out of the hierarchy management by using the unmount command. In Formula A3, the manager specifies a file system path by which a real file system is mounted in the unmount command. When FIG. 2 is exemplified concretely, the manager instructs the hierarchy management file system program 1006 to detach the file system mounted in the /Tier 1 out of the hierarchy management as indicated by Formula B3.

(Tier Moving Command)

Formulas A4 and B4 show exemplary commands inputted when the manager or the user of the client 1030 moves tier of a file. Formula A4 is a format of a process for moving the tier and Formula B4 is its concrete example:

$$mv\_\text{tier-}t\ 2<\text{FILE}> \quad (A4)$$

$$mv\_\text{tier-}t\ 2\ \text{FILE1} \quad (B4)$$

The manager logs in the server 1001 by also coupling with the file request receiving program (terminal server program) 3001 by utilizing the terminal emulator of the management terminal 1020. Then, the manager executes the management command 1005 in order to attach the real file system in the hierarchy management.

In Formula A4, the option "-t" specifies a tier of destination. In FIG. 7 for example, while FILE 1 has been stored in the /Tier 1, it is moved to the /Tier 2 after when this command is executed.

Next, the process of each section will be explained.

(Hierarchy Management Attaching Process)

FIG. 8 is a flowchart showing processes for attaching the real file system in the hierarchy management. The process (hierarchy management attaching process) for attaching the real file system in the hierarchy management is carried out by the hierarchy management attachment processing section 8000 of the hierarchy management file system program 1006 (see FIG. 1). At first, the manager instructs to register a target file system of hierarchical management (the /Tier 1 or /Tier 2 in the case of FIG. 2) by using the mount command shown in Formula A1.

The mount command requests the hierarchy management attachment processing section 8000 to register the file system through the VFS 3002 of the operating system 1009. Then, the hierarchy management attachment processing section 8000 accepts the request of the hierarchy management attaching process in Step S8001.

Then, the hierarchy management attachment processing section 8000 acquires a file system registering request, i.e., the path of the target file system of hierarchical management and the option specified by the option "-o" in Step S8002.

Then, the hierarchy management attachment processing section 8000 analyzes the target file system of hierarchical management and the mount option in Step S8003. As a result of the analysis in Step S8003, the hierarchy management attachment processing section 8000 acquires a tier in which the target file system of hierarchical management is to be allocated from the option T and a hierarchy management directory of the pseudo file system 2001 to which the target file system of hierarchical management belongs from the option D in Step S8004.

In Step S8005, the hierarchy management attachment processing section 8000 determines whether or not the object file system is being hierarchically managed. The hierarchy management attachment processing section 8000 carries out this determination process by comparing the mount path 5001 with the path of the target file system of hierarchical management sequentially from the head of the list of the hierarchy data list 5000.

Here, if a coincident path has been already registered as a result of the comparison, i.e., Yes in Step S8005, an error is returned to the mount command through the VFS 3002. Then, the manager confirms that a problem has occurred from an indication of the error of the mount command.

If that file system is not hierarchically managed, i.e., No in Step S8005, the hierarchy management attachment processing section 8000 determines whether or not the option T has been set, i.e., whether or not tier is specified in the option in Step S8006. When the option T is not set, i.e., No in Step S8006, the hierarchy management attachment processing section 8000 of the hierarchy management file system program 1006 determines whether or not the path of the target file system of hierarchical management is registered in the hierarchy management table 4000 in Step S8007. If the path is not registered here, i.e., No in Step S8007, the hierarchy management attachment processing section 8000 of the hierarchy management file system program 1006 returns an error and ends the process.

If the path is registered in contrary, i.e., Yes in Step S8007, the hierarchy management attachment processing section 8000 advances to Step S8009 by supposing that the path is registered in the tier registered in the tier 4003 of the hierarchy management table 4000.

When the tier is specified in the option, i.e., Yes in Step S8006, the hierarchy management attachment processing section 8000 scans the hierarchy management table 4000 and updates the tier 4003 (hierarchy information) of the hierarchy management table 4000. If no tier is found, the hierarchy management attachment processing section 8000 creates a new record (hierarchy information) and adds to the hierarchy management table 4000 in Step S8008.

Then, the hierarchy management attachment processing section 8000 creates hierarchy data and inserts it into the list structure of the hierarchy data list 5000 in Step S8009. The hierarchy management attachment processing section 8000 of the hierarchy management file system program 1006 then determines whether or not there exists the file management table 7000 in Step S8010.

When there exists the file management table 7000, i.e., Yes in Step S8010, the hierarchy management attachment processing section 8000 of the hierarchy management file system program 1006 acquires a record whose post-conversion FSID (7003) coincides with the FSID of the target file system of hierarchical management in Step S8013.

Then, the hierarchy management attachment processing section 8000 takes a file that coincides with the file name 7001 in the record of the file management table 7000 out of the target file system of hierarchical management to compare with the post-conversion inode No. 7004 in Step S8014. If there is an inconsistent record at this time, the hierarchy management attachment processing section 8000 deletes it and outputs an error message. The hierarchy management attachment processing section 8000 carries out the operations of Steps S8013 and S8014 to all corresponding records.

If no file management table 7000 is found in Step S8010, i.e., No in Step S8010, the hierarchy management attachment processing section 8000 scans all files in the target file system of hierarchical management and creates a new file management table in Step S8011.

Then, finally, the hierarchy management attachment processing section 8000 stores the file management table 7000 and the hierarchy management table 4000 in the FSM file system 1017 in Step S8012 and ends the series of the processes.

The new real file system is registered as the target file system of hierarchical management by the hierarchy management attaching process as described above. The manager can create the pseudo file system 2001 in which a plurality of real file systems are stacked by carrying out this operation to the plurality of real file systems.

The present embodiment also allows a new tier to be added by the hierarchy management attachment processing section 8000 of the hierarchy management file system program 1006 that registers a newly added file system in the hierarchy management table 4000 and adds file information in the file management table 7000. As a result, the manager can freely add the new tier by executing the hierarchy management attaching process to the new file system by using the commands.

Specifically, in the file server, e.g., the server 1001 having the storage system such as the RAID device 1014 including the first volume, e.g., the FC disk drive 1012*b*, the second volume, e.g., the SATA disk drive 1013 and the third volume, e.g., the FC disk drive 1012*a*, and coupled with the storage system and the client 1030, the hierarchy management attachment processing section 8000 allows the file server to initialize (to format) the first volume as a first file system, e.g., the FS1 (1015), to initialize the second volume as a second file system, e.g., the FC2 1016, and to define the pseudo file system 2001, e.g., from Step S8008 through Step S8012, virtually storing a hierarchical file group containing first and second file groups in a directory corresponding to a first directory name based on the first file group stored in the first directory corresponding to a predetermined directory name of the first file system and the second file group stored in a second directory corresponding to a first directory name of the second file system. The definition described above may be stored in the third volume as correspondence information, e.g., the file management table 7000, of the hierarchical file group with the first and second file groups. It is noted that although the correspondence information has been explained mainly as the file management table 7000, it may be a management table integrated with the hierarchy management table 4000.

(Hierarchy Management Detaching Process)

FIG. 9 is a flowchart showing processes for detaching the real file system out of the hierarchy management. The hierarchy management detachment processing section 9000 (see FIG. 1) of the hierarchy management file system program 1006 carries out the process for detaching the real file system out of the hierarchy management. At first, the manager issues a command of requesting the hierarchy management file system to detach a file system to be detached (/Tier 1 or /Tier 2 in the case of FIG. 2) by using the unmount command shown in Formula A3.

The unmount command requests the hierarchy management detachment processing section 9000 to detach the file system through the VFS 3002 of the operating system 1009. Then, the hierarchy management detachment processing section 9000 accepts the request for the hierarchy management detachment process in Step S9001.

Then, the hierarchy management detachment processing section 9000 acquires a name (path) of the file system to be detached through the VFS 3002 in Step S9002. Then, the hierarchy management detachment processing section 9000 searches the file system to be detached from the list of the hierarchy data list 5000 in Step S9003 to determine whether there is the file system to be detached in Step S9004. If there is no file system to be detached, i.e., No in Step S9004, the hierarchy management detachment processing section 9000 returns an error to the unmount command through the VFS 3002 in Step S9007 and ends the hierarchy management detachment process.

If there is the file system to be detached, i.e., Yes in Step S9004, the hierarchy management detachment processing section 9000 searches data of the file system to be detached from the list of the hierarchy data list 5000 and removes the data in Step S9005.

Finally, the hierarchy management detachment processing section 9000 of the hierarchy management file system program 1006 releases the data (hierarchy management data) detached out of the hierarchy data list 5000 in Step S9005 in Step S9006 and ends the hierarchy management detachment process. The manager can detach one of file systems to be hierarchically mounted out of the objects of the hierarchy management by the hierarchy management detachment process described above.

Note that it is preferable to specify one or more files corresponding to the file group storing the file system to be detached from the hierarchical file group of the pseudo file system 2001 corresponding to the releasing request specifying the file system to be detached, to delete the correspondence regarding the specified one or more files out of the correspondence information, e.g., the file management table 7000, and to prevent to transmit a file name corresponding to one more files specified from the file name reference request (readdir request) specifying the pseudo file system 2001 and the directory name from the client 1030.

Step S9005 means to release the definition of the pseudo file system and corresponding to the release, the server may access to the first file system, e.g., the FS1 (1015), when the server receives an access request specifying one of the file group stored in the specified first file system from the client 1030.

(Management Information Rebuilding Process)

FIG. 10 is a flowchart showing processes for rebuilding the file management table. The management information rebuilding processing section 10000 of the hierarchy management file system program 1006 carries out the processes for rebuilding the file management table.

When the manager recognizes that a failure has occurred in the pseudo file system 2001 from logs and others, the manager specifies the hierarchy management table 4000 and the hierarchy management directory (the directory of the pseudo file system 2001) and instructs to execute the management information rebuilding process by using the mount command shown in Formula A2.

The mount command requests the management information rebuilding process to the management information rebuilding processing section 10000 through the VFS 3002 of the operating system 1009. Then, the management information rebuilding processing section 10000 accepts the request of the management information rebuilding process in Step S10001. The management information rebuilding processing section 10000 determines the management information rebuilding process from the option of the mount command.

Then, the management information rebuilding processing section 10000 acquires information of the hierarchy management table 4000 through the VFS 3002 to determine whether or not there is the hierarchy management table 4000 in Step S10002.

If there is no hierarchy management table 4000 here, i.e., No in Step S10002, the management information rebuilding processing section 10000 returns an error to the mount command through the VFS 3002. The mount command requests the manager to create a hierarchy management table 4000 in Step S10008 and ends the process. In this state, the manager has to execute the hierarchy management attaching process shown in FIG. 8 to construct the pseudo file system 2001 from the beginning.

If there exists the hierarchy management table 4000 in contrary, i.e., Yes in Step S10002, the management information rebuilding processing section 10000 selects a real file system whose tier is the lowest out of the hierarchy management table 4000 in Step S10003. Then, the management information rebuilding processing section 10000 scans the file system selected in Step S10003 and creates file management tables for all files existing within the file system in Step S 10004.

Then, the management information rebuilding processing section 10000 stores the file management tables in the FSM file system 1017 in Step S10005 and checks the hierarchy management table 4000 to determine whether or not there exists a non-processed tier in Step S10006.

If there exists a non-processed tier, i.e., Yes in Step S10006, the management information rebuilding processing section 10000 selects a file system whose tier is next high with respect to the file system processed previously in Step S10007 and returns the process to Step S10004. If there exists no more non-processed tier in the determination process in Step S1006, i.e., No in Step S1006, the management information rebuilding processing section 10000 ends the management information rebuilding process.

Even if the file management table 7000 is destroyed, the manager can recover it by carrying out the operations described above. It is noted that the management information rebuilding process may be carried out by reasons other than what described above. Still more, different commands other than the mount command for activating the hierarchy management attaching process may be used for the command that executes the management information rebuilding process.

(Tier Moving Process)

FIG. 11 is a flowchart showing the process for conducting the tier movement of the file. The tier move processing section 11000 of the hierarchy management file system program 1006 carries out the process (tier moving process) for hierarchically moving the file. At first, the manager instructs to execute the tier moving process of the file by using mv_tier command shown in Formula A4. Thereby, the mv_tier command requests the tier move processing section 11000 of the hierarchy management file system program 1006 to conduct the tier moving process through the VFS 3002 of the operating system 1009. This is carried out by using an interface of the VFS 3002 called as ioctl for example.

The tier move processing section 11000 accepts the request for the tier moving process through the VFS 3002 in Step S11002. Then, the tier move processing section 11000 determines whether or not there exists a file of a file name accepted in the request for the tier moving process by making reference to the file management table 7000 in Step S11003. If there exists no file, i.e., No in Step S11003, the tier move processing section 11000 returns an error indicating that there exists no file to the mv_tier command through the VFS 3002 in Step S11004 and ends the process.

If there exists a file in contrary, i.e., Yes in Step S11003, the tier move processing section 11000 determines whether or not the file specified by the manager is in use (opened) in Step S11005. If the file is in use, i.e., Yes in Step S11005, the tier move processing section 11000 returns an error indicating that the file is in use to the mv_tier command through the VFS 3002 in Step S11009 and ends the process.

If the file is not in use, i.e., No in Step S11005, the tier move processing section 11000 rewrites the post-conversion FSID 7003 of the record of the file management table 7000 to FSID of the destination of the move in Step S11007. Finally, the tier move processing section 11000 copies the file to be moved while maintaining the path to the specified tier, deletes the file from the original tier in Step S11008 and ends the series of process.

When a file exists in a path called "/DIR/FILE" in the FS1 (1015) in FIG. 2 and when the tier move processing section 11000 moves this file to the FS2 (1016) of the second hierarchy for example, the tier move processing section 11000 creates a "/DIR" directory in the FS2 (1016) and then moves FILE to that directory. Thereby, the manager can freely move the tier of the specific file.

Note that although a directory space provided within the NAS (Network Attached Storage) is conceivable as the file name and the path name specified by the mv_tier command, the mv_tier command may be transmitted from the client 1030 to the server 1001. However, because the client 1030 is preset to read from/write to a corresponding file by a directory space different from the server 1001 by the Export function, the file name specified by the mv_tier may be a file name in the directory space provided by the Export function. In this case, the server 1001 (mainly the file request receiving program 3001) is required to convert an argument of the mv_tier command into a file name in the directory space within the server by using conversion of the Export function.

(Lookup Process)

FIG. 12 is a flowchart showing a Lookup process of the hierarchy management file system program. The Lookup process of the hierarchy management file system program 1006 is a process that is carried out by the VFS 3002 (see FIG. 3) and whose result is returned by the Lookup processing section 12000 (see FIG. 1) of the hierarchy management file system program 1006 to the VFS 3002.

When the file request receiving program 3001 accesses to a file in the pseudo file system 2001, the hierarchy management file system program 1006 executes the Lookup process through the VFS 3002. Note that while it is conceivable to execute this process at a moment when the file request receiving program 3001 receives the lookup request, this process may be executed at a moment other than that. The file request receiving program 3001 specifies a file or a directory to be processed by using information accompanied to the lookup request. An outline of the Lookup process will be explained at first.

The Lookup process is a process by which the operating system 1009 analyzes an access path of a file. In the Lookup process, the VFS 3002 acquires management information (inode) of an element per name (element) delimited by "/" of a path name.

This will be explained here by exemplifying a case of a Lookup process of a path name "/DIR/FILE". At first, the VFS 3002 recognizes "/" at the head and queries inode of "DIR" out of the elements (file or directory) stored in "/" (root directory) to the file system. At this time, the VFS 3002 passes the inode of "/" and the name of "DIR" to the file system. Then, the file system returns the inode of DIR to the VFS 3002. Then, the VFS 3002 queries the inode of "FILE" out of the elements stored in DIR. Then, the file system returns the inode of FILE to the VFS 3002. Thereby, it becomes possible to acquire the inode of FILE that is a purpose of the Lookup process.

Returning to FIG. 12, the Lookup processing section 12000 accepts the management information (inode) of a parent directory ("DIR" in the case of the DIR/FILE) and name information (directory entry) of an object of the Lookup process from the VFS 3002 in Step S12001. Then, the Lookup processing section 12000 specifies a file name from the directory entry in Step S12002. That is, the Lookup processing section 12000 acquires a complete path by using the name information of the file and scans the complete path (file name) from the file management table 7000 in Step S12003.

The Lookup processing section 12000 thus determines whether or not the file exists in Step S12004. If no file is found here, i.e., No in Step S12004, the Lookup processing section 12000 ends the process without setting anything to a return value.

If the file is found in contrary, i.e., Yes in Step S12004, the Lookup processing section 12000 acquires the post-conversion FSID 7003 and the post-conversion inode No. 7004 from a corresponding record of the file management table 7000 in Step S12005, acquires management information of the real file system from the post-conversion FSID 7003 in Step S12006 and acquires management information (inode information) of an real file from the management information and the post-conversion inode No. in Step S12007.

Then, the Lookup processing section 12000 replaces file handling functions that require pre-processing in accessing to the file from the inode in Step S12008. File handling functions of a file writing process and others are registered in the inode information and the Lookup processing section 12000 replaces their processes. The Lookup processing section 12000 replaces by aiming at the processes regarding the tree structure of the pseudo file system 2001. Thereby, the Lookup processing section 12000 can receive processes such as an analysis of path of the pseudo file system 2001 in advance of the real file system.

Finally, the Lookup processing section 12000 correlates the name information of the object of the Lookup process with the inode information in Step S12009 and ends the process. It is noted that the inode information contains information regarding whether or not the file may be read/written, an access time, a modification time, a generation time, positional information of a volume in which real data of the file is stored and others.

(Creat Process)

Figure 13:
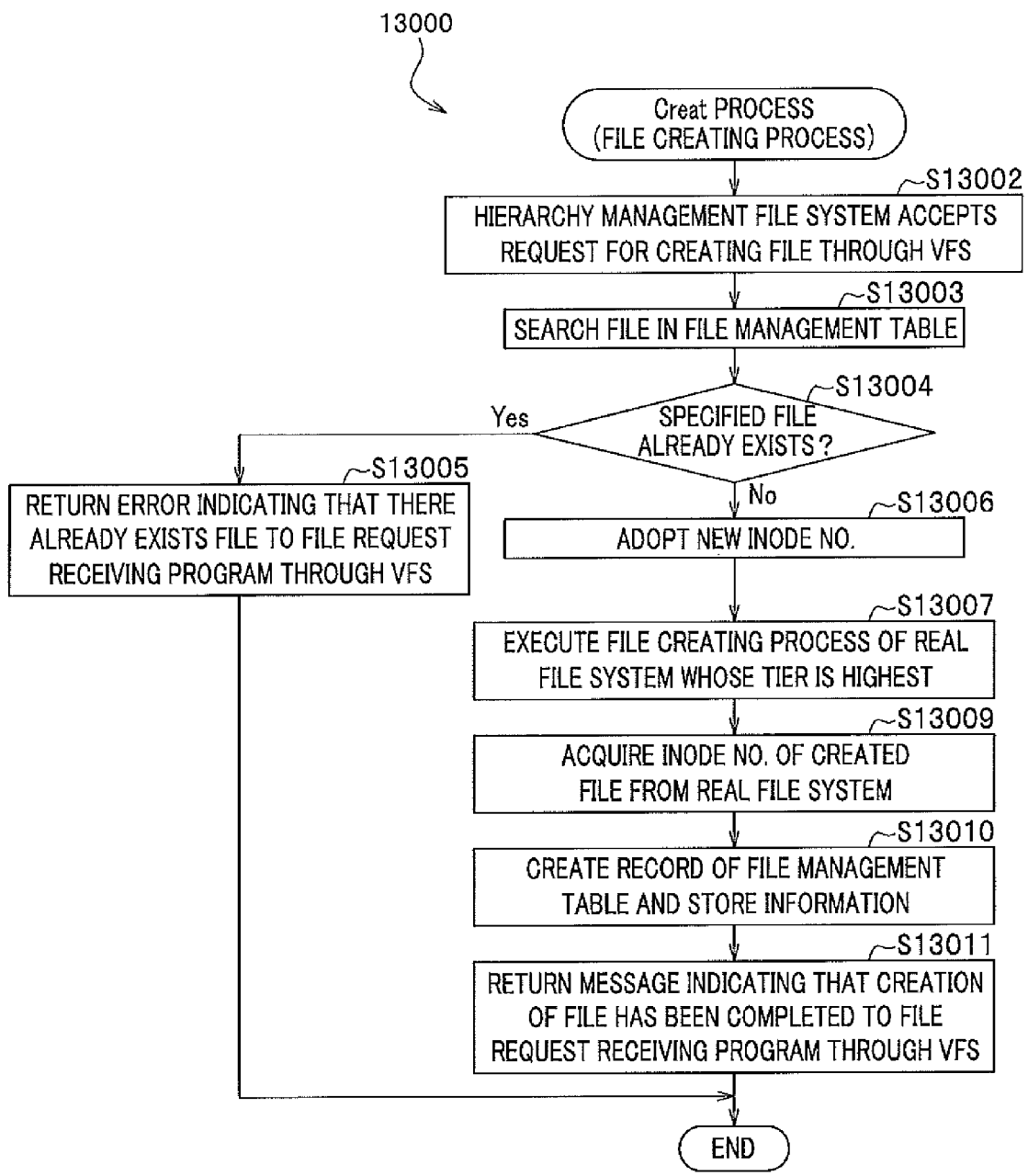
FIG. 13 is a flowchart showing a Creat process of the hierarchy management file system program.

FIG. 13 is a flowchart showing a Creat process of the hierarchy management file system program. The Creat process of the hierarchy management file system program 1006 is a process carried out by the Creat processing section 13000 of the hierarchy management file system program 1006 through the VFS 3002 when the file request receiving program 3001 creates a file (Creat process) in the pseudo file system 2001 (see FIG. 1).

Note that although the Creat processing section 13000 executes this process possibly when the file request receiving program 3001 receives a creat request, the Creat processing section 13000 may execute this process in other cases. Still more, the Creat processing section 13000 specifies the file to be processed by using information accompanied to the creat request and the lookup request as necessary.

The Creat processing section 13000 of the hierarchy management file system program 1006 accepts the request for creating the file from the file request receiving program 3001 through the VFS 3002 in Step S13002. Then, the Creat processing section 13000 checks the file management table 7000 to search the file specified by the name of the file creating request in Step S13003 and determines whether or not the specified file has been already created, i.e., whether or not it exists, in Step S13004.

If there already exists the specified file, i.e., Yes in Step S13004, the Creat processing section 13000 returns an error to the file request receiving program 3001 in Step S13005 and ends this process. If there exists no specified file in contrary, i.e., No in Step S13004, the Creat processing section 13000 adopts a new non-used inode No. from the inode No. 7002 of the file management table 7000 in Step S13006. Then, the Creat processing section 13000 executes the file creating process of a real file system, e.g., the FS1 in FIG. 2, whose tier is the highest among file paths requested by the file request receiving program 3001 in Step S13007.

Then, the Creat processing section 13000 acquires an inode No. of the file created by the real file system in Step S13009 and creates a record of the file management table 7000 to store the file name 7001, the inode No. 7002, the post-conversion FSID 7003 and the post-conversion inode No. 7004 in the FSM file system 1017 as information in Step S13010. Finally, the Creat processing section 13000 returns a message that the creation of the file has been completed to the file request receiving program 3001 through the VFS 3002 in Step S13011 and ends the process.

The file is created in the real file system with the same file path with the file path recorded in the file name 7001 of the file management table 7000 by the process described above.

(Mkdir Process)

FIG. 14 is a flowchart showing a Mkdir process of the hierarchy management file system program. The Mkdir process of the hierarchy management file system program 1006 is a process carried out by the Mkdir processing section 14000 (see FIG. 1) of the hierarchy management file system program 1006 through the VFS 3002 when the file request receiving program 3001 executes a process (Mkdir process) for creating a directory in the pseudo file system 2001.

Note that although the Mkdir processing section 14000 executes this process possibly when the file request receiving program 3001 receives a mkdir request, the Mkdir processing section 14000 may execute this process in other cases. Still more, the Mkdir processing section 14000 specifies the directory to be processed by using information accompanying the mkdir request and the lookup request as necessary.

The Mkdir processing section 14000 of the hierarchy management file system program 1006 accepts the request for creating the directory from the file request receiving program 3001 through the VFS 3002 in Step S14002. Then, the Mkdir processing section 14000 checks the file management table 7000 to search the directory specified by the name of the directory creating request in Step S14003 and determines whether or not the specified file has been already created, i.e., whether or not it exists, in Step S13004.

If there already exists the specified directory, i.e., Yes in Step S14004, the Mkdir processing section 14000 returns an error to the file request receiving program 3001 in Step S14005 and ends this process.

If there exists no specified directory in contrary, i.e., No in Step S14004, the Mkdir processing section 14000 adopts a new non-used inode No. from the inode No. 7002 of the file management table 7000 in Step S14006. Then, the Mkdir processing section 14000 executes the directory creating process of a real file system, e.g., the FS1 in FIG. 2, whose tier is the highest among directory paths requested by the directory request receiving program 3001 in Step S14007.

Then, the Mkdir processing section 14000 acquires an inode No. of the directory created by the real file system in Step S14008 and creates a record of the file management table 7000 to store (set) the file name 7001, the inode No. 7002, the post-conversion FSID 7003 and the post-conversion inode No. 7004 in the FSM file system 1017 as information in Step S14009. Finally, the Mkdir processing section 14000 returns a message that the creation of the file has been completed to the file request receiving program 3001 through the VFS 3002 in Step S14010 and ends the process.

The directory is created in the real file system with the same directory path with the directory path recorded in the file name 7001 of the file management table 7000 by the process described above.

(Readdir Process)

FIG. 15 is a flowchart showing a Readdir process of the hierarchy management file system program. The Readdir process of the hierarchy management file system program 1006 is a process carried out by the Readdir processing section 15000 (see FIG. 1) of the hierarchy management file system program 1006 through the VFS 3002 when the file request receiving program 3001 executes a process (Readdir process) for acquiring file list information of the pseudo file system 2001.

Note that although the Readdir processing section 15000 executes this process possibly when the file request receiving program 3001 receives a readdir request, the Readdir processing section 15000 may execute this process in other cases. Still more, the Readdir processing section 15000 specifies the directory to be processed by using information accompanying the readdir request and the lookup request as necessary.

The Readdir processing section 15000 accepts the request for acquiring the file list information from the file request receiving program 3001 through the VFS 3002 in Step S15002. Then, the Readdir processing section 15000 checks the file management table 7000 to search the file name 7001 and the path name of the target directory received from the file request receiving program 3001 by a prefix search in Step S15003 and determines whether or not the specified directory exists in Step S15004.

If there exists the specified directory path, i.e., Yes in Step S15004, the Readdir processing section 15000 stores the corresponding file name (path) shown in FIG. 7 to a buffer memory for returning results (returning buffer) in Step S15005 and restarts to search from a next entry of the file management table 7000 in Step S15007.

If there exists no specified directory path in contrary, i.e., No in Step S15004, the Readdir processing section 15000 returns the file list information (whole entries) and the number of entries acquired in the result returning buffer memory in Steps S15005 and S15007 to the file request receiving program 3001 through the VFS 3002 in Step S15008 and ends the process.

The file request receiving program 3001 can acquire the file list information of a specific directory in the pseudo file system 2001 by the process described above.

(Open Process)

Figure 16:
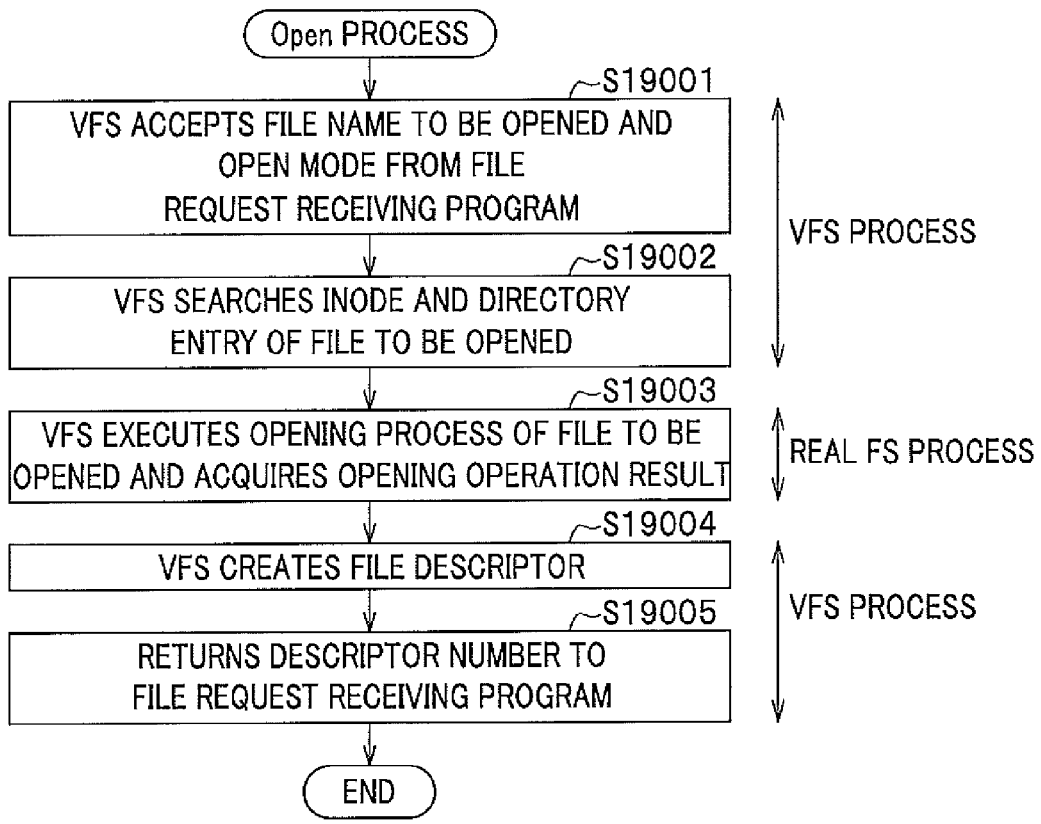
FIG. 16 is a flowchart showing an Open process.

FIG. 16 is a flowchart showing an Open process. The Opening process is a process carried out by the VFS 3002 and the real file system program 1007 shown in FIG. 3 when the file request receiving program 3001 executes a process (Opening process) for opening a file of the pseudo file system 2001.

Note that although the VFS 3002 and the real file system program 1007 execute this process possibly when the file request receiving program 3001 receives an open request, the VFS 3002 and the real file system program 1007 may execute this process in other cases. Still more, the VFS 3002 and the real file system program 1007 specify the file to be opened by using information accompanied to the open request and the lookup request as necessary.

The file request receiving program 3001 requests to open the file to the VFS 3002 by using an open interface (OPEN system call). At this time, the VFS 3002 receives a name of the file to be opened and an open mode from the file request receiving program 3001 in Step S19001.

Then, the VFS 3002 searches inode that is management information of the file to be opened and a directory entry that is a name management information with the file name in Step S19002. The VFS 3002 carries out this process by way of the Lookup process described above.

File handling functions of the real file system program 1007 are set in the inode acquired in the Lookup process. Then, the VFS 3002 executes an open handling function set in the inode. As a result, the VFS 3002 acquires an open operating result of the real file system program 1007 in Step S19003.

The VFS 3002 creates a file descriptor used in uniquely specifying the file opened by the file request receiving program 3001 in Step S19004. At this time, the VFS 3002 sets the file handling function in the file descriptor. Finally, the VFS 3002 assigns a number to the file descriptor and returns the number to the file request receiving program 3001 in Step S19005. Note that the file descriptor is an identifier used by the operating system 1009 in identifying a file accessed by a program and standard input/output. Still more, the VFS process in the figure means a process handled by the VFS 3002 and the real file system process is a process handled mainly by the real file system program 1007 (partly includes a process to be handled by the VFS 3002).

As described above, the hierarchy management file system program 1006 is not involved in the file opening process. It thus allows the use of the CPU 1002 to be reduced in opening a file and the file opening process to be quickened.

(Read Process)

Figure 17:
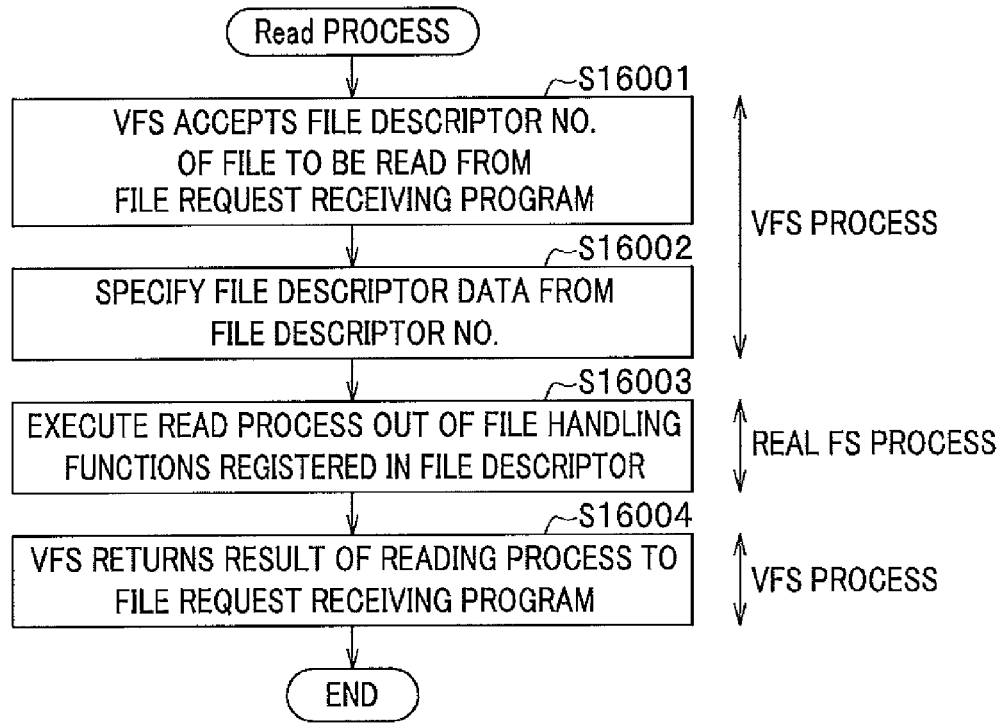
FIG. 17 is a flowchart showing a Read process.

FIG. 17 is a flowchart showing a Read process. The Read process is a process carried out by the VFS 3002 and the real file system program 1007 shown in FIG. 3 when the file request receiving program 3001 executes a process (Read process) for reading a file of the pseudo file system 2001.

Note that although the VFS 3002 and the real file system program 1007 execute this process possibly when the file request receiving program 3001 receives a read request, the VFS 3002 and the real file system program 1007 may execute this process in other cases. Still more, the VFS 3002 and the real file system program 1007 specify the file to be read by using information accompanying the read request and the lookup request as necessary.

The file request receiving program 3001 requests to read the file to the VFS 3002 by using a read interface (READ system call). At this time, the VFS 3002 receives a file descriptor number of the file to be read from the file request receiving program 3001, i.e., an application, in Step S16001.

Then, the VFS 3002 searches file descriptor data from the file descriptor number in Step S16002 and executes a read handling process (Read process) out of the file handling functions registered in the file descriptor in Step S16003. Thus, the VFS 3002 executes the read handling process of the real file system program 1007 and acquires data to be read stored in the volume as data of the specified file as a result.

Finally, the VFS 3002 receives file reading results, i.e., the data of the Read process, from the real file system program 1007 and returns to the file request receiving program 3001 in Step S16004. Then, naturally, the file request receiving program 3001 sends the data of the Read process to the client 1030 that has transmitted the read request.

As described above, the hierarchy management file system program 1006 is not involved in the file reading process. It thus allows the use of the CPU 1002 to be reduced in reading a file and the file reading process to be quickened.

(Write Process)

Figure 18:
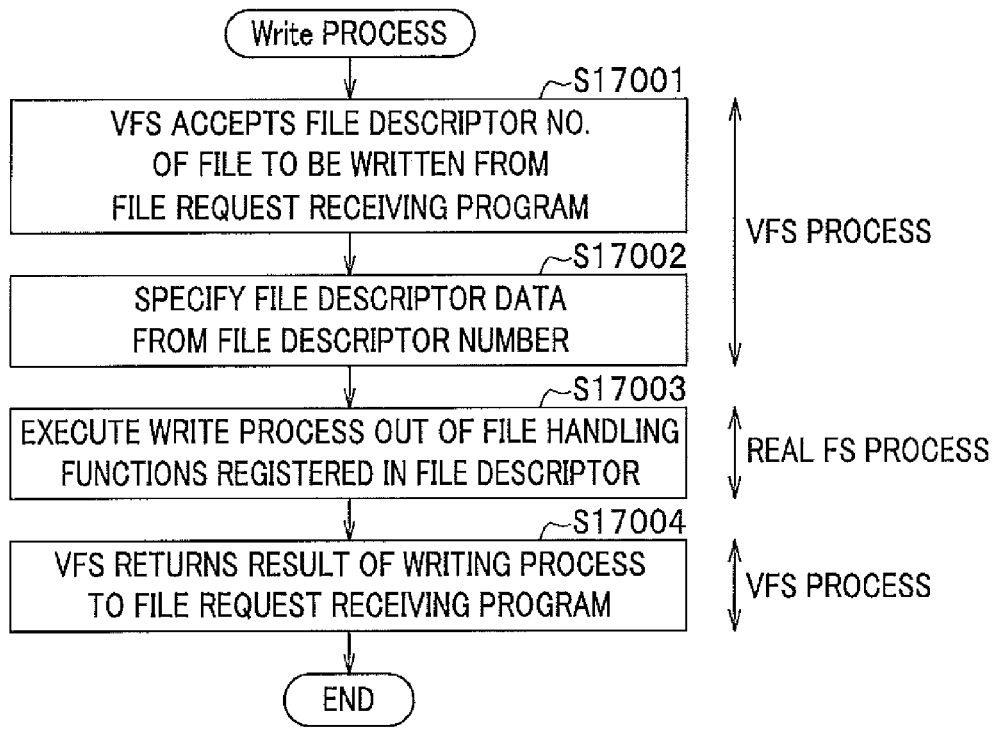
FIG. 18 is a flowchart showing a Write process.

FIG. 18 is a flowchart showing a Write process. The Write process is a process carried out by the VFS 3002 and the real file system program 1007 shown in FIG. 3 when the file request receiving program 3001 executes a process (write process) for writing data into a file of the pseudo file system 2001.

Note that although the VFS 3002 and the real file system program 1007 execute this process possibly when the file request receiving program 3001 receives a write request, the VFS 3002 and the real file system program 1007 may execute this process in other cases. Still more, the VFS 3002 and the real file system program 1007 specify the file to be processed by using information accompanied to the write request and the lookup request as necessary.

The file request receiving program 3001 requests to write data into the file to the VFS 3002 by using a write interface (WRITE system call). At this time, the VFS 3002 receives a file descriptor number of the file to be written from the file request receiving program 3001, i.e., an application, in Step S17001.

Then, the VFS 3002 specifies file descriptor data from the file descriptor number in Step S17002 and executes a write handling process (Write process) out of the file handling functions registered in the file descriptor in Step S17003. Thus, the VFS 3002 executes the write handling process of the real file system program 1007 and as a result, stores Write data in the volume as data of the specified file. Note that before the process of storing into the volume, the VFS 3002 may store the Write data temporarily into a cache memory of the server 1001 or of the RAID device 1014 and to store it into the volume after completing this process.

Finally, the VFS 3002 receives file writing results, i.e., the result of the Write process, from the real file system program 1007 and returns to the file request receiving program 3001 in Step S17004.

As described above, the hierarchy management file system program 1006 is not involved in the file writing process. It thus allows the use of the CPU 1002 to be reduced in the file writing process and the file writing process to be quickened.

(Close Process)

Figure 19:
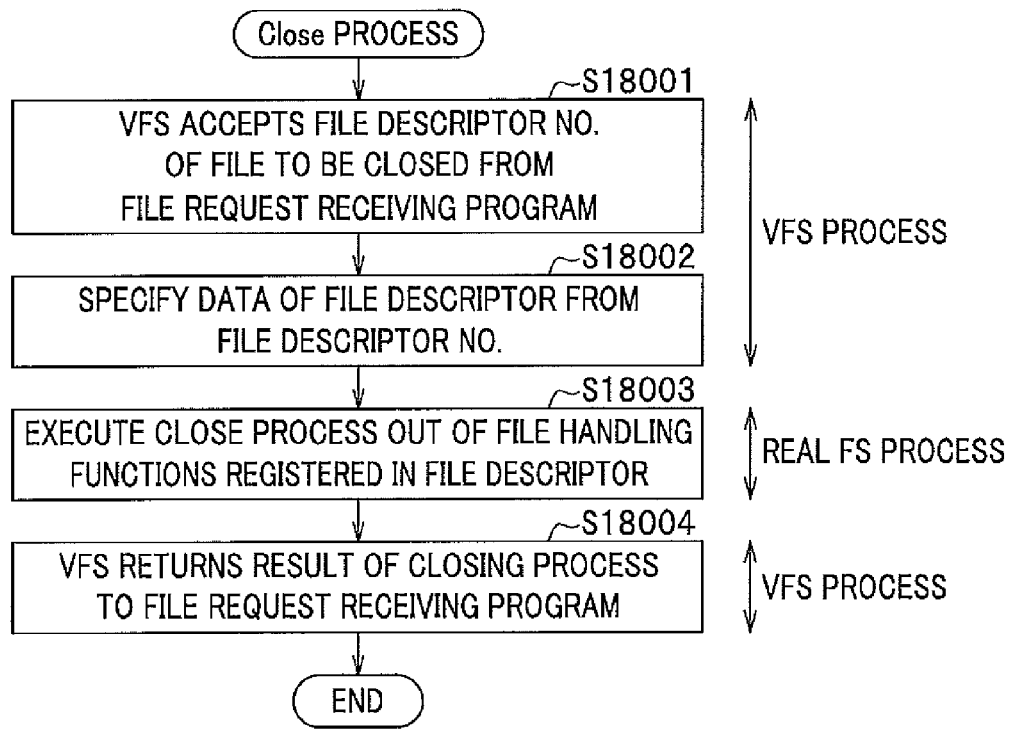
FIG. 19 is a flowchart showing a Close process.

FIG. 19 is a flowchart showing a Close process. The Close process is a process carried out by the VFS 3002 and the real file system program 1007 when the file request receiving program 3001 executes a process (Close process) for closing a file of the pseudo file system 2001.

Note that although the VFS 3002 and the real file system program 1007 execute this process possibly when the file request receiving program 3001 receives a close request, the VFS 3002 and the real file system program 1007 may execute this process in other cases. Still more, the VFS 3002 and the real file system program 1007 specify the file to be processed by using information accompanying the write request and the lookup request or the open request as necessary.

The file request receiving program 3001 requests to close the file to the VFS 3002 by using a close interface (CLOSE system call). At this time, the VFS 3002 receives a file descriptor number of the file to be closed from the file request receiving program 3001, i.e., an application, in Step S18001.

Then, the VFS 3002 specifies file descriptor data from the file descriptor number in Step S18002 and executes a close handling process (Close process) out of the file handling functions registered in the file descriptor in Step S18003. Thus, the VFS 3002 executes the close handling process of the real file system program 1007.

Finally, the VFS 3002 receives file closing results from the real file system program 1007 and returns to the file request receiving program 3001 in Step S18004.

As described above, the hierarchy management file system program 1006 is not involved in the file close process. It thus allows the use of the CPU 1002 to be reduced in closing a file and the file closing process to be quickened.

It is noted that the hierarchy management file system program 1006 may receive all of the file operations explained in connection with FIGS. 13 through 19 and may carry out error processing.

For instance, sections for processing the file operations explained in connection with FIGS. 13 through 19 may be provided in the hierarchy management file system program 1006. Then, all of the file handling processes including ones explained in FIGS. 13 through 19 may be switched (replaced) in Step S12008 of the Lookup processing section 12000 of the hierarchy management file system program 1006. Then, when the file request receiving program 3001 accesses to the pseudo file system 2001, the file handling process of the hierarchy management file system program 1006 detects an error. Normally, when an error occurs in the file system, the server stops (closes) its operation. However, in this case, while the hierarchy management file system program 1006 returns the error to the file request receiving program 3001, the server can continue the process. Note that the file handling process here is the process of the Creat process in FIG. 13, the Mkdir process in FIG. 14, the Open process in FIG. 16, the Read process in FIG. 17, the Write process in FIG. 18 or the Close process in FIG. 19.

The abovementioned process allows the readdir request (file name referring request) for referring a directory name or a file name in a directory space provided by the server 1001 to return a normal result by processing and referring to a volume storing a file management table causing no failure and the operation of the user to be continued until receiving a process, other than the readdir request, that requires an access to the volume actually causing the failure. While such merit is effective especially when an abnormality occurs temporarily in a connection from the server 1001 to the RAID device 1014 (or possibly a device having a volume storing a file management table, other than the RAID device) even though a connection from the server 1001 to the RAID device 1014 to access to the volume storing the file management table is normal, it is possible to enjoy the merit of the abovementioned process also in other cases when an access cannot be made to the volume storing data of the file.

As described above, the server 1001 creates the file systems respectively in the high-speed and low-speed volumes. The hierarchy management file system program 1006 creates the pseudo file system 2001 in which the file systems are allocated so that they are stacked. Then, when the file request receiving program 3001 creates a file in the pseudo file system 2001, the file request receiving program 3001 creates the file in the high-speed volume file system. Then, the manager moves the created file to the low-speed volume file system by using the commands. At this time, the manager rewrites a table managing the file to be ready for a next file access. Meanwhile, processes such as reading from and writing into the file that do not affect the namespace of the pseudo file system 2001 are processed by the real file system program 1007 without going through the hierarchy management file system program 1006.

These operations prevent the file system from being copied when the file request receiving program 3001 accesses to the file moved to the low-speed volume and prevent the access performance from dropping. Still more, because the management information is not stored in the same high-speed volume storing the file system, e.g., the FS1 (1015), the low-speed volume is not influenced even if a failure occurs in the high-speed volume. Still more, the management information may be rebuilt even if it is destroyed, so that it is easy to recover from the failure. Then, if the file system is being destroyed when the client 1030 accesses to the file, the real file system program 1007 that manages that file system deals with the failure. It allows a failure management of the hierarchy management file system program 1006 to be simplified.

Still more, because the real file systems are managed in hierarchy, it becomes easy to add a new volume. That is, when the RAID device 1014 supports a new high-performance volume during when the pseudo file system 2001 is operated by the hierarchy management HSM function, that volume may be readily added.

Second Embodiment

According to a second embodiment, the file management table 7000 is modified such that it includes inode information. It is also possible to improve the file accessing performance as compared to the first embodiment by providing a cache for the file management table 7000.

Figures 20, 21, 22:
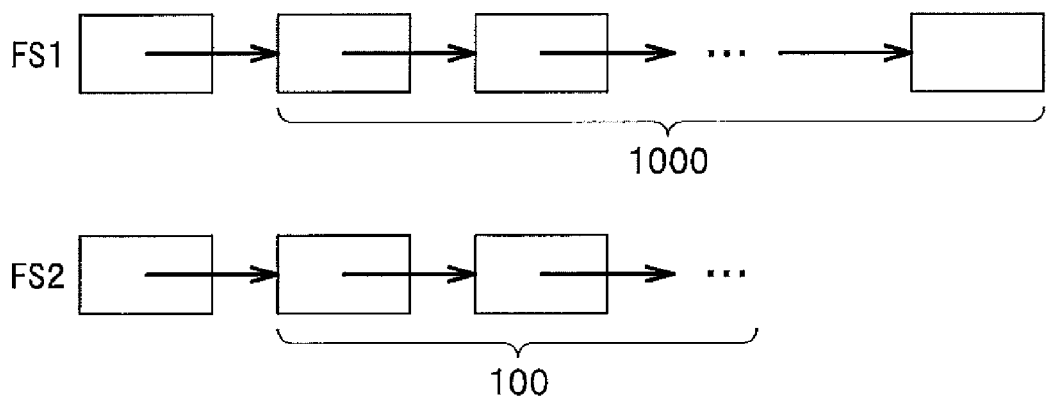
FIG. 20 shows a file management table according to a second embodiment.
FIG. 21 shows a structure of a file management table cache of the second embodiment.
FIG. 22 shows a list structure constructed when the file management table cache of the second embodiment is used.

FIG. 20 shows a file management table according to the second embodiment. The file management table 20000 is part of the management information 1010. The file management table 20000 is a table for managing information of a real file system in which files are stored.

Although the file management table 7000 (see FIG. 7) in the first embodiment holds the inode No. that is used by the hierarchy management file system program 1006, the file management table 20000 of the second embodiment holds inode information 20001 instead of the inode No. Information such as file accessed time and date and file accessing permission, including the inode No., is recorded in the inode information. It allows the hierarchy management file system program 1006 to acquire the inode information not from the real file system but from the file management table 20000.

FIG. 21 shows a structure of a file management table cache of the second embodiment. As shown in FIG. 21, 21000 is composed of a file name 21001, inode information 21002 corresponding to that file, a post-conversion FSID 21003, a post-conversion inode No. 21004 and a pointer 21005 used in building a list structure. An entry of the file management table cache 21000 is created in the memory 1008.

FIG. 22 shows a list structure constructed when the file management table cache of the second embodiment is used. At first, a header exists at a head of the list. A special file name of "FS1" is recorded in the inode information 20001. Thereby, the hierarchy management file system program 1006 can specify a real file system that corresponds to the list. A newest entry of the file management table cache 21000 is coupled next to the header. Meanwhile, an oldest entry of the file management table cache 21000 is coupled to the rearmost end. The hierarchy management file system program 1006 controls a fixed number of entries of the file management table cache 21000 so that the memory 1008 is not depleted by the caches.

As shown in FIG. 22, a number of entries coupled with the cache is different per each real file system. For example, the hierarchy management file system program 1006 sets a number of entries of the high-speed volume file system (the FS1 in FIG. 2) at 1000 and a number of entries of the low-speed volume file system (the FS2 in FIG. 2) at 100. Normally, although the file request receiving program 3001 frequently accesses to the high-speed volume file system, it barely accesses to the low-speed volume file system. Accordingly, the hierarchy management file system program 1006 can effectively utilize the cache by setting a more number of entries for the high-speed volume and a less number of entries for the low-speed volume.

Figure 23:
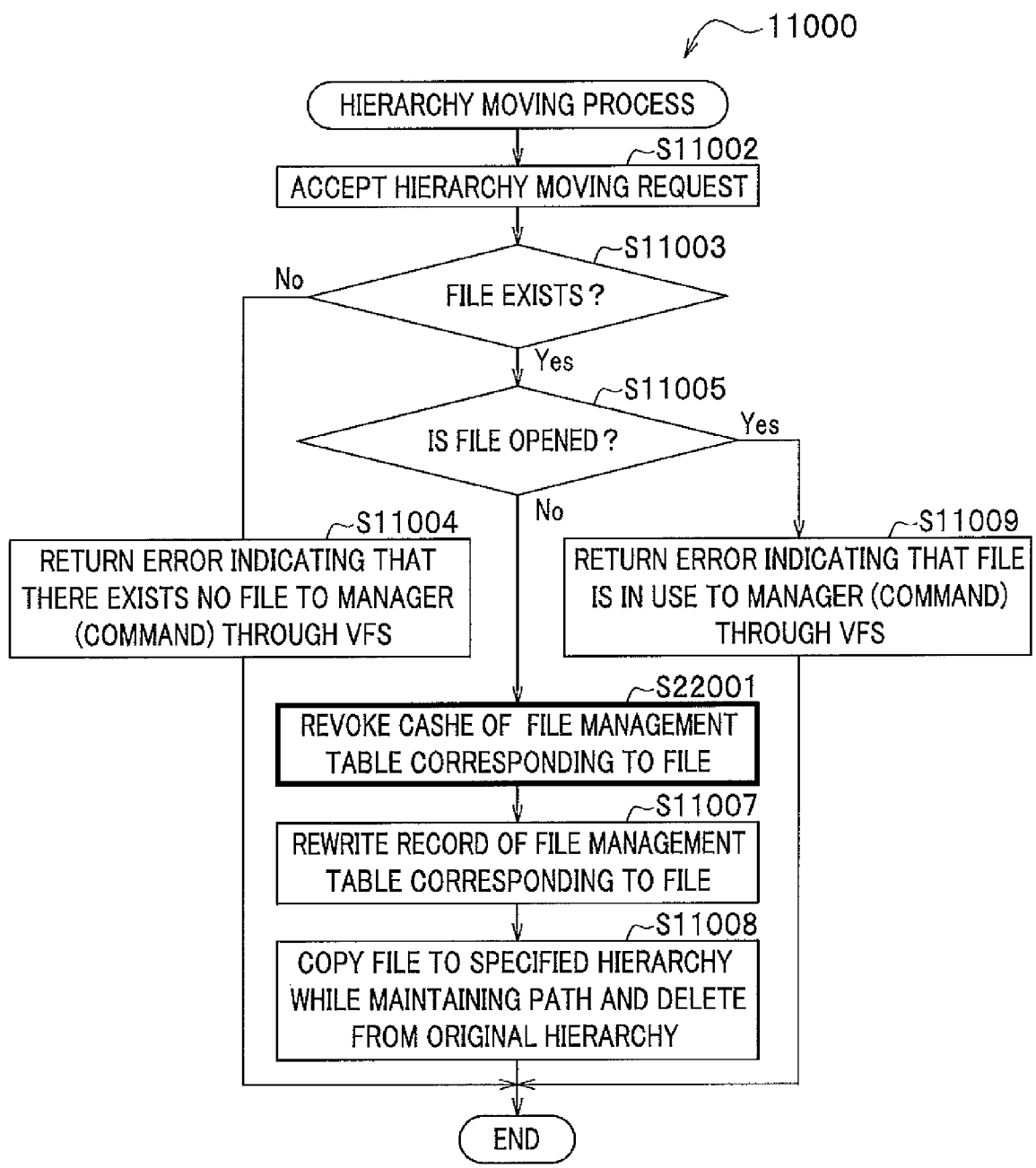
FIG. 23 is a flowchart showing processes in moving the hierarchy of the file of the second embodiment.

FIG. 23 is a flowchart showing processes in moving the hierarchy of the file according to the second embodiment. The manager carries out the process (tier moving process) for moving the hierarchy of the file by the tier move processing section 11000 of the hierarchy management file system program 1006 by using the mv_tier command shown in Formula A4. The same processes shown in FIG. 23 with those shown in FIG. 11 are denoted by the same reference numerals and an explanation thereof will be omitted here.

Step S22001 is added in the process shown in FIG. 23 as compared to the process shown in FIG. 11. When Step S11005 is No, the tier move processing section 11000 revokes the file management table cache 21000 in Step S22001. It is because the file management table cache 21000 is created per each real file system, it accesses to erroneous information unless the cache is revoked. Accordingly, the tier move processing section 11000 carries out Step S22001 to revoke the cache.

FIG. 24 is a flowchart showing a Lookup process of the second embodiment. The Lookup process is a process executed by the Lookup processing section 12000 through the VFS 3002 when the file request receiving program 3001 accesses to a file of the pseudo file system 2001. The same processes in FIG. 24 with those shown in FIG. 12 will be denoted by the same reference numerals and an explanation thereof will be omitted here.

The Lookup processing section 12000 of the second embodiment checks a file name in the file management table cache 21000 (cache) at first in acquiring inode from the file name in Step S23001. Then, the Lookup processing section 12000 determines whether or not there exists the file name in Step S23002.

When the Lookup processing section 12000 obtains file information corresponding to the file name from the cache, i.e., Yes in Step S23002, the Lookup processing section 12000 carries out the processes in and after Step S12005 by using the post-conversion FSID 21003 and the post-conversion inode No. 21004 of the file management table cache 21000 (see FIG. 21). The processes in and after Step S12005 are the same with those of the first embodiment shown in FIG. 12, so that their explanation will be omitted here.

If there is no file name, i.e., No in Step S23002, the Lookup processing section 12000 checks the file management table 7000 in Step S12003 to determine whether or not there is the file name in Step S12004. If there is the file name, i.e., Yes in Step S12004, the Lookup processing section 12000 acquires the inode information 20001 from the file management table 20000 in Step S23003.

Then, the Lookup processing section 12000 checks a number of entries of the file management table cache 21000, i.e., a number of caches, to determine whether or not the number of caches goes over in Step S23004. If the number of entries goes over, i.e., Yes in Step S23004, the Lookup processing section 12000 removes and deletes the oldest cache entry out of the cache in Step S23005 and continues the process after that. If the number of entries does not go over in contrary, i.e., No in Step S23004, the Lookup processing section 12000 creates an entry of the file management table cache 21000, sets all values and couples to a head of the list in Step S23006. Then, the Lookup processing section 12000 continues the same processes with those of the first embodiment shown in FIG. 12.

In the first embodiment, FIG. 8 shows the operation (hierarchy management attaching process) operated by the manager in attaching the real file system in the hierarchy management by using the mount command shown in Formula A1. The hierarchy management attachment processing section 8000 checks (scans) the real file system to create the file management table 7000 in Step S8011 in the hierarchy management attaching process of the first embodiment. In the second embodiment, however, the hierarchy management attachment processing section 8000 acquires inode information at this time and sets the inode information 20001 of the file management table 20000.

The second embodiment also allows the performance for acquiring file information to be improved when a very low-speed volume is added in the hierarchy management.

The embodiments of the invention described above may be summarized as follows. However, the embodiments are not limited only to those summarized below.

That is, there is provided the file management method of the file server having the storage system including first, second and third volumes and coupled with the storage system and a client computer.

The file management method includes steps of:
initializing the first volume as a first file system;
initializing the second volume as a second file system;
defining a pseudo file system virtually storing a hierarchical file group including first and second file groups in a directory corresponding to a first directory name based on the first file group stored in the first directory corresponding to the predetermined directory name of the first file system and the second file group stored in a second directory corresponding to the first directory name of the second file system;
storing correspondence information of the hierarchical file group, the first file group and the second file group in the third volume in accordance to the defining step;
accessing to the first or second file system based on the correspondence information when the client computer sends an access request specifying one of the hierarchical file group;
specifying a file to be moved from the hierarchical file group; and
copying data of part of files of the first file group corresponding to the file to be moved from the first file system to the second file system to change the correspondence regarding the file to be moved of the correspondence information.

It is noted that the correspondence information may have correspondence indicating whether the data is stored in the first file system or the second file system per each file contained in the hierarchical file group. The file management method may further include a step of re-creating the correspondence information by accessing to the first and second volumes when the server accepts a request for a rebuilding process. The move target file may be a file detected and specified by the file server when no access is made thereto for a certain period of time.

The file management method of the file server may further include steps of:
detecting a failure of the second volume;
transmitting a file name corresponding to one or more files which are part of the hierarchical file group and virtually containing the first and second file groups by making reference to the correspondence information in response to a file name referring request specifying the first directory name received from the client computer; and
transmitting an error in response to a request for reading from or writing into a file and specifying one of the files in the hierarchical file group received from the client computer corresponding to the detection of the failure.

The file management method may also include steps of:
specifying one or more files corresponding to the second file group stored in the second file system out of the hierarchical file group of the pseudo file system corresponding to a release request specifying the second file system; and deleting correspondence regarding the specified one or more files from the correspondence information to prevent transmission of the file names corresponding to specified one or more files from the file name referring request specifying the pseudo file system and the first directory name from the client computer.

The file management method of the file server may further include steps of:

releasing the definition of the pseudo file system; and accessing to the first file system corresponding to the release when the server accepts an access request specifying one of the first file group stored in the first file system specified from the client computer.

According to the present embodiment, it is possible to prevent the access performance from dropping because no file moves when the user accesses to the file stored in the low-speed storage. Still more, even if the high-speed storage is destroyed, the low-speed storage may be used. Still more, because the configuration of the hierarchy management HSM function in operation may be changed, a new file system may be readily added in the configuration of the hierarchy management HSM function already built. It is noted that the present invention is widely applicable to servers that provide the file-sharing function.

It is noted that although the mode described above is the best mode for carrying out the invention, it is not intended to limit the invention to such mode. Accordingly, the mode for carrying out the invention may be variously modified within a scope in which the subject matter of the invention is not changed.

What is claimed is:

1. A file management method of a file server having a storage system having first and second volumes, comprising:
    initializing the first volume as a first file system;
    initializing the second volume as a second file system;
    wherein the first file system and the second file system represent a real file system;
    defining a pseudo file system virtually and hierarchically integrates the first file system and the second file system;
    storing management information for each of the files managed in a hierarchical file group, the first file system or the second file system in which each of the file is stored and an identifier of file management information of each corresponding file,
    accessing to the first or second file system based on the management information when the server receives an access request specifying one file system of the hierarchical file group from the client computer;
    specifying a file to be subjected to a migration move in the hierarchical file group; and
    copying data of the file of the first file system corresponding to the file to be moved, from the first file system to the second file system, changing the management information regarding the file to be moved while maintaining a file name in the correspondence information in the second file system, where the file name is a complete path name used in the first file system for the file, and then deleting the file from the first file system,
    in response to a read request of the first file, access to the second file system by making reference to the management information, read the first file stored in the second file system and transfer the read first file as a response to the read request without first storing the read first file.

2. A file system comprising:
    a storage system providing a plurality of volumes using a plurality of drives; and
    a file server managing a real file system and a hierarchy management file system;
    wherein
    the real file system storing at least a first file system in first one of the plurality of volumes and a second file system in second one of the plurality of volumes,
    the hierarchy management file system providing a pseudo file system which virtually and hierarchically integrates the first file system and the second file system,
    the storage system storing management information indicating, for each of the files managed in the pseudo file system, either the first file system or the second file system in which each of the files is stored and an identifier of file management information of each corresponding file;
    wherein the file server is configured to:
    specify a first file which is stored in the first file system and which satisfies a predetermined migration condition,
    copy the first file to the second file system, while maintaining a file name of the first file in the second file system, which is a complete path name used in the first file system, with rewriting of the management information of the first file so as to indicate that the first file is in the second file system, and
    delete the first file in the first file system; and
    in response to a read request of the first file, access to the second file system by making reference to the management information, read the first file stored in the second file system and transfer the read first file as a response to the read request without first storing the read first file.

3. The file system according to the claim 2, wherein:
    the first one of the plurality of volumes is provided with first type drives with higher performance than second type drives that provide the second one of the plurality of volumes, and
    the first file system has a higher hierarchy level than the second file system, in the pseudo file system.

4. The file system according to the claim 2, wherein the maintained file name is the path name under a mount path of the first file system.

5. The file system according to the claim 4, wherein the maintained file name is also used by a client in accessing the pseudo file system.

6. The file system according to the claim 3, wherein the predetermined migration condition is based on access frequency of a file.

7. The file system according to the claim 3, wherein the file server is configured to:
    in response to a request to create a second file,
    create the second file in the first file system having the higher hierarchy in the pseudo file system, and
    store, for the second file, a file name formed of a path in the first file system, in the file management information.

8. The file system according to the claim 2, wherein the file server is further configured to:
    in response to a request to detach the first file system from the pseudo file system,
    specify files stored in the first file system, and
    delete information associated to the specified files, from the file management information.

9. The file system according to the claim 2, wherein the file server is further configured to return an error in case the specified first file is opened, without executing a copy.

10. A file migration method for a file system, where the file system includes:
- a storage system providing a plurality of volumes using a plurality of drives; and
- a file server managing a real file system and a hierarchy management file system;

wherein:
the real file system storing at least a first file system in first one of the plurality of volumes and a second file system in second one of the plurality of volumes, the hierarchy management file system providing a pseudo file system which virtually and hierarchically integrates the first file system and the second file system, the storage system storing management information indicating, for each of the files managed in the pseudo file system, either the first file system or the second file system in which each of the files is stored and an identifier of file management information of each corresponding file;

wherein the file migration method comprising:

specifying a first file which is stored in the first file system and which satisfies a predetermined migration condition, copying the first file to the second file system, while maintaining a file name of the first file in the second file system, which is a complete path name used in the first file system, with rewriting the management information of a first file so as to indicate that the first file is in the second file system, and deleting the first file in the first file system; and in response to a reading request of the first file, accessing to the second file system by making reference to the management information, reading the first file stored in the second file system and transferring the read first file as a response to the reading request without first storing the read first file.

11. The file migration method according to the claim 10, wherein:
the first one of the plurality of volumes is provided with first type drives with higher performance than second type drives that provide the second one of the plurality of volumes, and the first file system has a higher hierarchy level than the second file system, in the pseudo file system.

12. The file migration method system according to the claim 10, wherein the maintained file name is the path name under a mount path of the first file system.

13. The file migration method according to the claim 12, wherein the maintained file name is also used by a client in accessing the pseudo file system.

14. The file migration method according to the claim 11, wherein the predetermined migration condition is based on access frequency of a file.

15. The file migration method according to the claim 11, further comprising:
in response to a request to create a second file,
creating the second file in the first file system having the higher hierarchy in the pseudo file system, and
storing, for the second file, a file name formed of a path in the first file system, in the file management information.

16. The file migration method according to the claim 10, further comprising:
in response to a request to detach the first file system from the pseudo file system,
specifying files stored in the first file system, and
deleting information associated to the specified files, from the file management information.

17. The file migration method according to the claim 10, further comprising returning an error in case the specified first file is opened, without executing a copy.

\* \* \* \* \*